(12) United States Patent
Tayu

(10) Patent No.: US 12,372,630 B2
(45) Date of Patent: Jul. 29, 2025

(54) DISTANCE MEASURING DEVICE AND DISTANCE MEASURING METHOD

(71) Applicant: Sony Semiconductor Solutions Corporation, Kanagawa (JP)

(72) Inventor: Kenichi Tayu, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 1121 days.

(21) Appl. No.: 17/291,443

(22) PCT Filed: Dec. 18, 2019

(86) PCT No.: PCT/JP2019/049654
§ 371 (c)(1),
(2) Date: May 5, 2021

(87) PCT Pub. No.: WO2020/137755
PCT Pub. Date: Jul. 2, 2020

(65) Prior Publication Data
US 2022/0003849 A1    Jan. 6, 2022

(30) Foreign Application Priority Data
Dec. 27, 2018  (JP) .................................. 2018-245390

(51) Int. Cl.
*G01S 7/4865* (2020.01)
*G01S 7/48* (2006.01)
*G01S 17/10* (2020.01)

(52) U.S. Cl.
CPC .......... *G01S 7/4865* (2013.01); *G01S 7/4808* (2013.01); *G01S 17/10* (2013.01)

(58) Field of Classification Search
CPC .... G01S 17/931; G01S 7/4865; B60Q 1/0023
See application file for complete search history.

(56) References Cited

U.S. PATENT DOCUMENTS

| 5,847,833 A | 12/1998 | Yokoyama et al. |
| 2008/0219677 A1* | 9/2008 | Asano ................. H04B 10/548 |
| | | 398/185 |

(Continued)

FOREIGN PATENT DOCUMENTS

| CN | 101900745 A | 12/2010 |
| CN | 102073051 A | 5/2011 |

(Continued)

OTHER PUBLICATIONS

Sung-Jin Kim, Taeik Kim and Hojin Park, "A 0.63ps, 12b, synchronous cyclic TDC using a time adder for on-chip jitter measurement of a SoC in 28nm CMOS technology," 2014 Symposium on VLSI Circuits Digest of Technical Papers, Honolulu, HI, USA, 2014, pp. 1-2, doi: 10.1109/VLSIC.2014.6858447. (Year: 2014).*

(Continued)

*Primary Examiner* — Luke D Ratcliffe
*Assistant Examiner* — Clara G Chilton
(74) *Attorney, Agent, or Firm* — Michael Best & Friedrich LLP

(57) ABSTRACT

There is provided a distance measuring device capable of improving the accuracy of measurement while reducing power consumption. A variation amplification part amplifies a variation in a temporal relative relationship between an electrical signal output from a light receiving element and a clock signal generated by a clock generation unit. Subsequently, a synchronizing part generates a synchronizing signal by synchronizing an electrical signal with a clock signal on the basis of the electrical signal and the clock signal after a variation is amplified by a variation amplification part. Subsequently, a histogram creating part creates a histogram based on a period of time from when a light source emits light to when the light receiving element receives reflected light, on the basis of the synchronizing (Continued)

signal generated by the synchronizing part. Subsequently, a distance calculation part calculates a distance to an object on the basis of the histogram created by the histogram creating part.

16 Claims, 19 Drawing Sheets

(56) References Cited

U.S. PATENT DOCUMENTS

| | | | | |
|---|---|---|---|---|
| 2016/0139266 | A1* | 5/2016 | Montoya | G01S 17/42 |
| | | | | 356/5.01 |
| 2017/0356984 | A1 | 12/2017 | Halmos | |
| 2018/0149753 | A1 | 5/2018 | Shin | |
| 2019/0353760 | A1* | 11/2019 | Hasegawa | H01L 31/107 |

FOREIGN PATENT DOCUMENTS

| | | | | |
|---|---|---|---|---|
| CN | 104024878 | A | | 9/2014 |
| CN | 104101880 | A | | 10/2014 |
| CN | 109085606 | A | | 12/2018 |
| EP | 2738571 | A1 | | 6/2014 |
| GB | 1279349 | A | * | 6/1972 ........... H03G 3/3084 |
| JP | 50-26233 | B1 | | 8/1975 |
| JP | 2002-214369 | A | | 7/2002 |
| JP | 2006-329902 | A | | 12/2006 |
| JP | 2014081254 | A | | 5/2014 |
| JP | 2014153160 | A | | 8/2014 |
| JP | 2017-53769 | A | | 3/2017 |
| JP | 2018-17534 | A | | 2/2018 |

OTHER PUBLICATIONS

International Search Report (PCT/ISA/210), International Application No. PCT/JP2019/049654, dated Feb. 27, 2020.
Notification of Transmittal of the International Search Report and the Written Opinion of the International Searching Authority, or the Declaration (PCT/ISA/220), International Application No. PCT/JP2019/049654, dated Mar. 10, 2020.
Written Opinion of the International Search Authority (PCT/ISA/237), International Application No. PCT/JP2019/049654, dated Mar. 10, 2020.

* cited by examiner

DISTANCE MEASURING DEVICE AND DISTANCE MEASURING METHOD

TECHNICAL FIELD

The present disclosure relates to a distance measuring device and a distance measuring method.

BACKGROUND ART

In recent years, a distance measuring device that directly measures a distance to an object using Time of Flight (ToF) has been proposed (see, for example, PTL 1). In the distance measuring device disclosed in PTL 1, a period of time from when a light source emits light to when a light receiving element receives reflected light is measured a large number of times, and the accuracy of distance measurement is improved using a histogram based on the periods of time measured a large number of times.

CITATION LIST

Patent Literature

[PTL 1]
JP 2014-081254 A

SUMMARY

Technical Problem

However, in such a distance measuring device, it is required to reduce power consumption and improve the accuracy of distance measurement.

An object of the present disclosure is to provide a distance measuring device and a distance measuring method which are capable of improving the accuracy of measurement while reducing power consumption.

Solution to Problem

A distance measuring device of the present disclosure includes (a) a light source configured to emit light, (b) a light receiving element configured to receive light reflected from an object reflecting the light, (c) a variation amplification part configured to amplify a variation in a temporal relative relationship between an electrical signal output from the light receiving element and a clock signal, (d) a synchronizing part configured to generate a synchronizing signal by synchronizing the electrical signal with the clock signal on the basis of the electrical signal and the clock signal after the variation is amplified by the variation amplification part, (e) a histogram creating part configured to create a histogram based on a period of time from when the light source emits light to when the light receiving element receives reflected light, on the basis of the synchronizing signal generated by the synchronizing part, and (f) a distance calculation part configured to calculate a distance to the object on the basis of the histogram created by the histogram creating part.

A distance measuring method of the present disclosure includes (a) receiving light, reflected from an object reflecting light received from a light source, by a light receiving element and outputting an electrical signal, (b) amplifying a variation in a temporal relative relationship between the output electrical signal and a dock signal (c) generating synchronizing signals one after another by synchronizing the electrical signal with the clock signal on the basis of the electrical signal and the dock signal after the variation is amplified, (d) creating a histogram based on a period of time from when the light source emits light to when the light receiving element receives reflected light, on the basis of the generated synchronizing signal, and (e) calculating a distance to the object on the basis of the created histogram.

DESCRIPTION OF EMBODIMENTS

The inventors have considered increasing an internal frequency in a case where highly accurate distance measurement is required in a distance measuring device and decreasing an internal frequency in a case where highly accurate distance measurement is not required. However, when an internal frequency is excessively low, distance measurement results are likely to be collected in one bin in a histogram based on a period of time from the emission of light to the reception of reflected light, and there is a problem in that the accuracy of position estimation through fitting of a probability density function deteriorates.

Hereinafter, examples of a distance measuring device and a distance measuring method according to an embodiment of the present disclosure will be described with reference to FIGS. 1 to 21. The embodiment of the present disclosure will be described in the following order. Meanwhile, the present disclosure is not limited to the following example. In addition, effects described in the present specification are merely examples and are not limited, and there may be other effects.

1. First embodiment: distance measuring device
1-1 Overall configuration of distance measuring device
1-2 Operations of distance measuring device
1-3 Modification example
2. Application example: mobile body control system

1. First Embodiment

1-1 Overall Configuration of Distance Measuring Device

Figure 1:
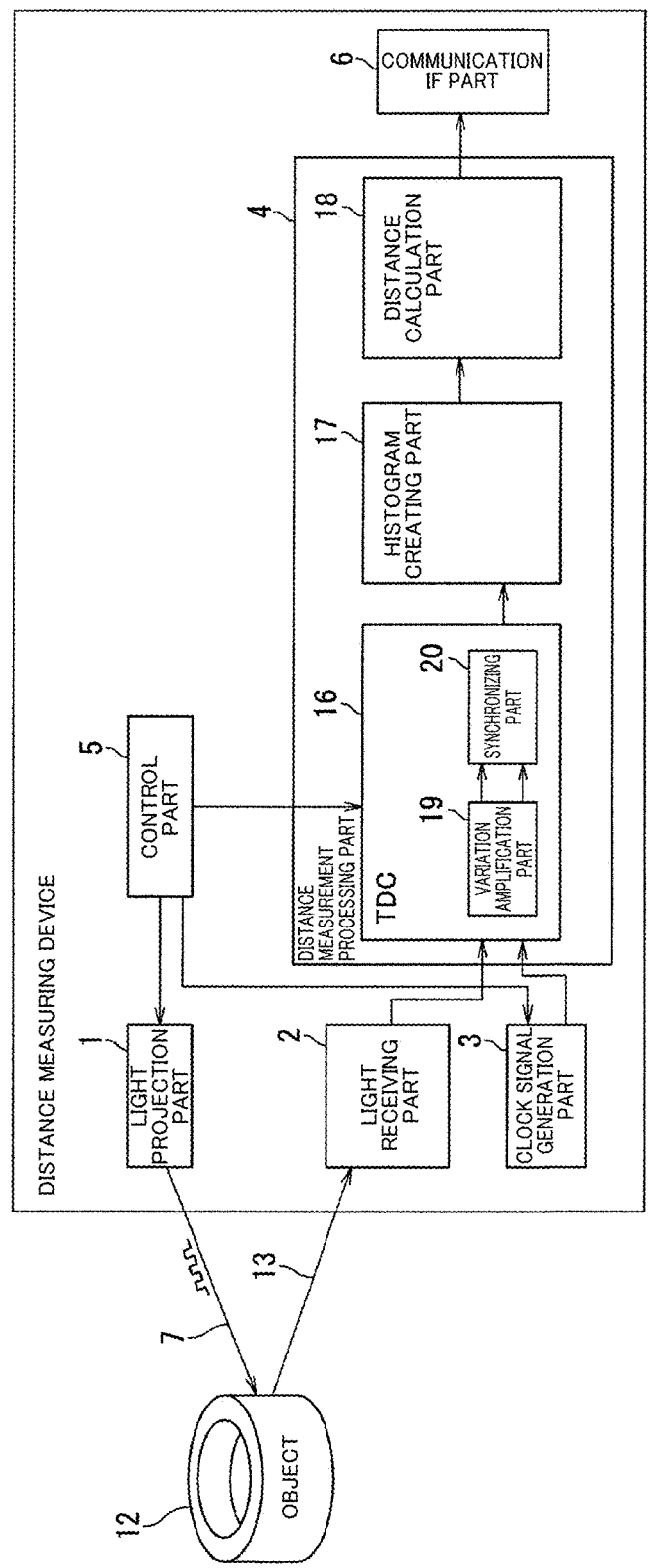
FIG. 1 is a diagram illustrating an overall configuration of a distance measuring device according to a first embodiment of the present disclosure.

FIG. 1 is a schematic configuration diagram illustrating the entirety of a distance measuring device according to a first embodiment of the present disclosure. The distance measuring device of FIG. 1 is a ToF distance measurement sensor. As illustrated in FIG. 1, the distance measuring device according to the first embodiment includes components such as a light projection part 1, a light receiving part 2, a clock signal generation part 3, a distance measurement processing part 4, and a control part 5. These components may be integrally configured as a system on a chip (SoC) such as a complementary MOS (CMOS) or a large scale integration (LSI), or some components such as the light projection part 1 and the light receiving part 2 may be configured as separate LSIs. The distance measuring device operates in response to a clock signal which is output from the clock signal generation part 3. The distance measuring device includes a communication IF part 6 for outputting distance measurement data according to a distance calculated by the distance measurement processing part 4 to the outside. Although not illustrated in the drawing, the distance measuring device is configured to be able to communicate with an external host IC through the communication IF part 6.

Figure 2:
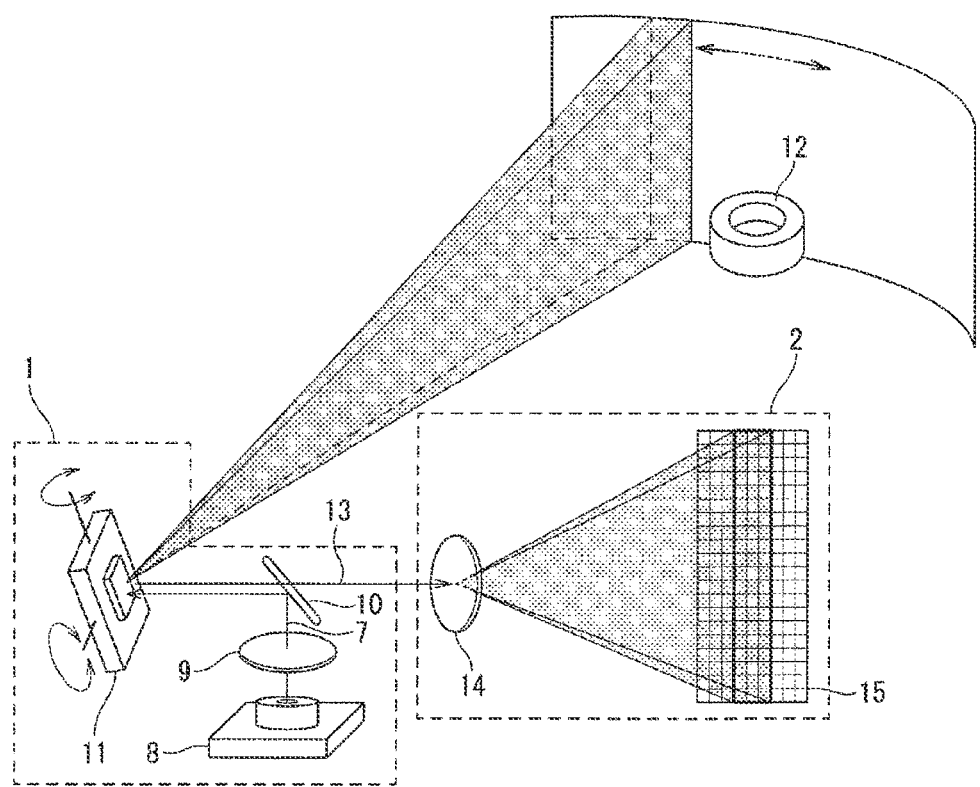
FIG. 2 is a diagram illustrating a configuration of a light projection part.

As illustrated in FIG. 2, the light projection part 1 includes a light source 8 that emits light 7 for ToF distance measurement. For example, a laser beam can be used as the light 7. The light source 8 may be, for example, an edge emitting semiconductor laser or may be a surface emitting semiconductor laser. The light source 8 is driven by a trigger pulse applied from the control part 5. The trigger pulse is a pulse-shaped signal having a predetermined frequency. In addition, the light projection part 1 includes a scanning mechanism for performing raster-scanning with the light 7. In FIG. 2, a mirror-scanning type scanning mechanism including an emitter lens 9, a light projection mirror 10, and a micro mirror 11 is illustrated as the scanning mechanism.

The micro mirror 11 changes the orientation of a reflection surface in response to a control signal applied from the control part 5. In addition, the light 7 emitted by the light source 8 is emitted in a direction corresponding to the orientation of the reflection surface of the micro mirror 11 through the emitter lens 9, the light projection mirror 10, and the micro mirror 11. The emitted light 7 is reflected by an object 12, and the reflected light 7 (hereinafter, also referred to as "reflected light 13") is incident on the light receiving part 2 through the micro mirror 11 and the light projection mirror 10. In this case, since a trigger pulse has a predetermined frequency and the light source 8 periodically emits light, the same part of the object 12 is irradiated a plurality of times with the light 7 emitted from the light source 8, and the reflected light 13 reflected from a position irradiated with the light 7 is incident on the same part (the light receiving element 15) of the light receiving part 2 a plurality of times. Examples of the object 12 include a preceding vehicle with respect to a host vehicle in a case where the distance measuring device is mounted on a vehicle, and the like.

The light receiving part 2 includes a receiver lens 14 and a plurality of light receiving elements 15. The plurality of light receiving elements 15 are disposed in a two-dimensional array. As the light receiving element 15, for example, a single photon avalanche diode (SPAD) that responds to received light and outputs an electrical signal can be used. In addition, the light receiving part 2 collects the reflected light 13 incident through the micro mirror 11 and the light projection mirror 10 by the receiver lens 14 and causes the light receiving element 15 according to a scanning direction of the light 7 to receive light. The electrical signal received from the light receiving element 15 is output to the distance measurement processing part 4.

Figure 3A:
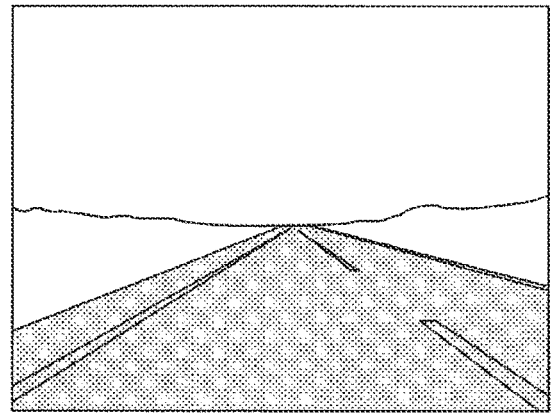
FIG. 3A is a diagram illustrating a method of setting a period of a CLK signal.
Figure 3B:
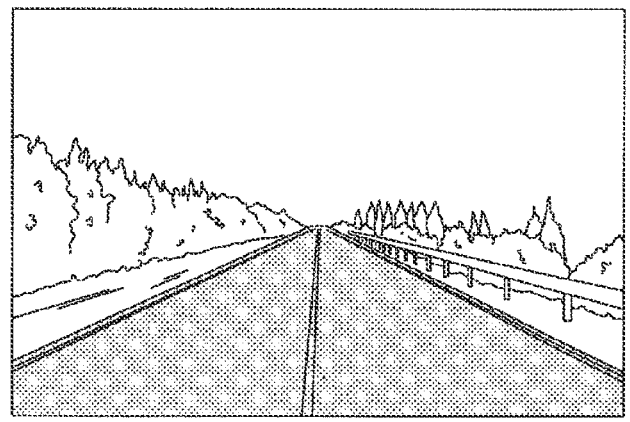
FIG. 3B is a diagram illustrating a method of setting a period of a CLK signal.
Figure 3C:
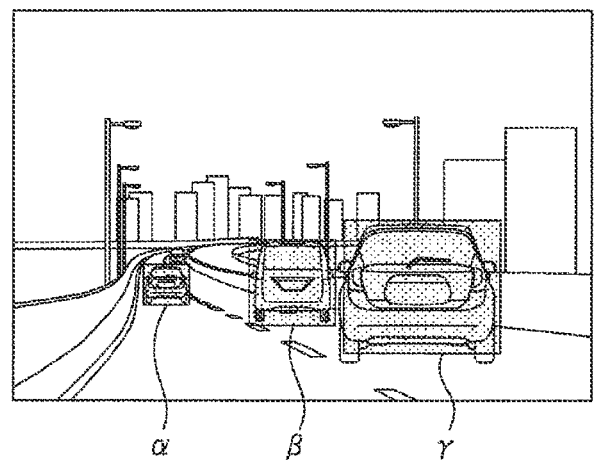
FIG. 3C is a diagram illustrating a method of setting a period of a CLK signal.

The clock signal generation part 3 generates a clock signal (hereinafter, also referred to as a "CLK signal") in response to a control signal received from the control part 5. The CLK signal is output to the distance measurement processing part 4. For example, when it is determined that there are no obstacles within a predetermined distance from the host vehicle as illustrated in FIGS. 3A and 3B in a case where the distance measuring device is mounted on a vehicle, the frequency of the CLK signal is set to a relatively small value so that, power consumption is reduced. On the other hand, when it is determined that there is an obstacle within a predetermined distance from the host vehicle as illustrated in FIG. 3C, the frequency of the CLK signal is set to a relatively large value in order to examine regions α, β, and γ in which obstacles are present on a road in detail. In addition, for example, low power consumption may be achieved by investigating all regions by reducing the frequency of the CLK signal, and then examining only the regions α, γ, and γ for which it is determined that there is an obstacle by increasing the frequency of the CLK signal.

Figure 4A:
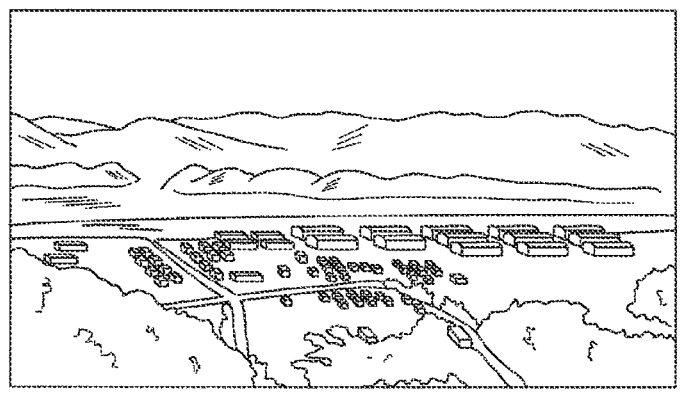
FIG. 4A is a diagram illustrating a method of setting a period of a CLK signal.
Figure 4B:
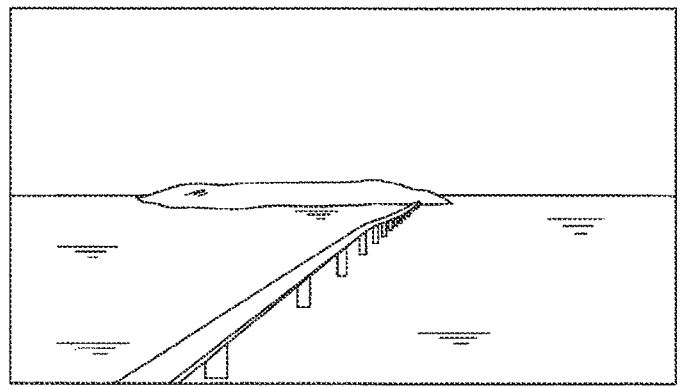
FIG. 4B is a diagram illustrating a method of setting a period of a CLK signal.

In addition, when it is determined that there are no obstacles within a predetermined distance from a drone as illustrated in FIGS. 4A and 4B, for example, in a case where the distance measuring device is mounted on the drone, the frequency of the CLK signal is set to a relatively small value so that power consumption is reduced. On the other hand, when it is determined that there is an obstacle, the frequency of the CLK signal is set to a relatively large value in order to examine a region in which an obstacle is present in detail.

The distance measurement processing part 4 is a component that calculates a distance to the object 12 on the basis of a timing at which the light source 8 emits the light 7 and a timing at which the light receiving part 2 receives the reflected light 13. The distance measurement processing part 4 is constituted by, for example, a signal processing processor. The distance measurement processing part 4 is configured to include a time-to-digital converter (TDC) 16, a histogram creating part 17, and a distance calculation part 18.

The TDC 16 is a component that converts a period of time from when the light 7 is emitted from the light source 8 to when the reflected light 13 is received by the light receiving element 15 (hereinafter, also referred to as an "arrival time") into a digital value, on the basis of a trigger pulse (a trigger pulse for driving the light source 8) applied from the control part 5 and a synchronizing signal generated by a synchronizing part 20. As the digital value, for example, a numerical value in a range of 0 to 255 can be used. The obtained digital value is output to the histogram creating part 17.

More specifically, the TDC 16 constitutes a variation amplification part 19 and the synchronizing part 20. The variation amplification part 19 is a component that amplifies a variation in a temporal relative relationship between an electrical signal output from the light receiving element 15 and a UK signal output from the clock signal generation part 3. It is preferable that the amount of amplitude of the variation be equal to or greater than ⅓ and equal to or less than ½ of the widths of bins of histograms illustrated in FIGS. 5A, 5B, and 5C that are created by the histogram creating part 17 so that a frequency of a certain section is reduced and a frequency of an adjacent section is increased. As illustrated in FIG. 6, the variation amplification part 19 is configured to include a first electrical path 21, a plurality of first addition parts $22_1$ to $22_n$ (n is a natural number of 2 or greater) and a first exclusive operation switch 23. In addition, the variation amplification part 19 is configured to include a second electrical path 24, a plurality of second addition parts $25_1$ to $25_n$, and a second exclusive operation switch 26.

The first electrical path 21 is a signal line of which one end is connected to an input terminal 27, receiving an input of an electrical signal from the light receiving element 15, and the other end is connected to one end of a first switch. $28_0$ included in the first exclusive operation switch 23. In addition, an electrical signal input from the light receiving element 15 is output to one end of the first switch $28_0$ included in the first exclusive operation switch 23 through the first electrical path 21.

Figure 7:
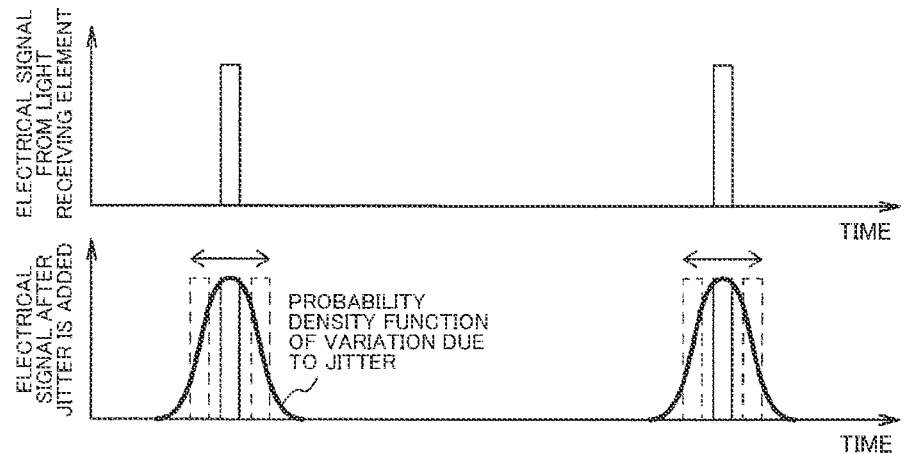
FIG. 7 is a diagram illustrating electrical signals before and after the addition of jitter.

Each of the first addition parts $22_i$ (i is any one of 1 to n) is a signal path which is disposed in parallel with the first electrical path 21 and of which one end is connected to the input terminal 27, receiving an input of an electrical signal from the light receiving element 15, and the other end is connected to one end of a first switch $28_i$ included in the first exclusive operation switch 23. In addition, the electrical signal output from the light receiving element 15 is output to one end of the first switch 28 included in the first exclusive operation switch 23 with jitter added thereto. Jitter is a variation component which is generated in a signal waveform in a time axis direction and is temporally extremely short. In this manner, jitter is added to the electrical signal, and thus the electrical signal after adding jitter varies in accordance with a probability density function of a variation due to jitter as illustrated in FIG. 7.

Figure 8A:
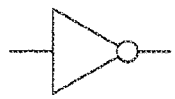
FIG. 8A is a diagram illustrating a NOT gate.
Figure 8B:
FIG. 8B is a diagram illustrating a NOR gate.
Figure 8C:
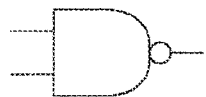
FIG. 8C is a diagram illustrating an AND gate.
Figure 8D:
FIG. 8D is a diagram illustrating XOR gate
Figure 9:
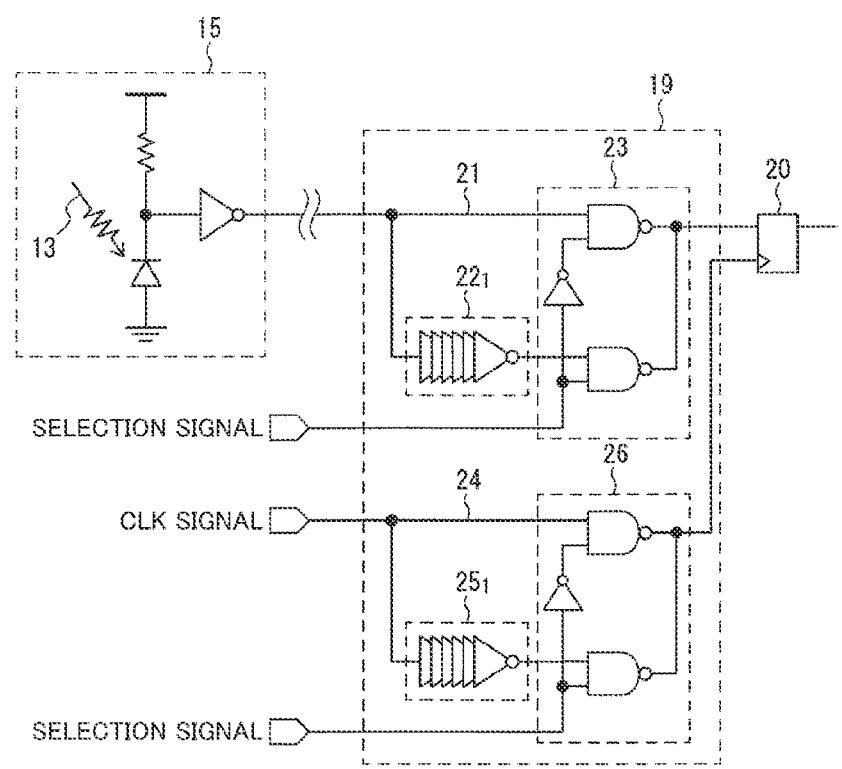
FIG. 9 is a diagram illustrating configurations of a first addition part and a second addition part.

Each of the first addition parts $22_1$ to $22_n$ may be configured using one or more logic gates such as a NOT gate as illustrated in FIG. 8A, a NOR gate as illustrated in FIG. 8B, an AND gate as illustrated in FIG. 8C, and an XOR gate as illustrated in FIG. 8D, For example, as illustrated in FIG. 9, each of the first addition parts $22_1$ to $22_n$ may be a multiple-stage delay circuit in which a large number of NOT gates are connected to each other in series. The logic gate is constituted by for example, a plurality of transistors. Meanwhile, in FIG. 9, a configuration having only the first addition part $22_1$ is illustrated as the first addition parts $22_1$ to $22_n$.

Figure 10A:
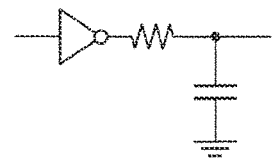
FIG. 10A is a diagram illustrating an RC circuit.
Figure 10B:
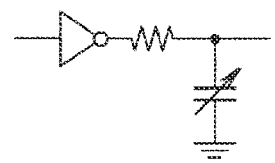
FIG. 10B is a diagram illustrating an RC circuit including a variable resistor.
Figure 10C:
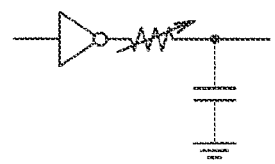
FIG. 10C is a diagram illustrating an RC circuit including a variable capacitor.
Figure 10D:
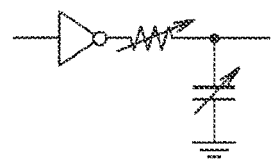
FIG. 10D is a diagram illustrating an RC circuit including a variable resistor and a variable capacitor.

In addition, each of the first addition parts $22_1$ to $22_n$ may be configured using one or more RC circuits as illustrated in FIG. 10A. By using the RC circuit, it is possible to blunt a signal edge and increase jitter. For example, each of the first addition parts $22_i$ to $22_n$ may be a multi-stage circuit in which a large number of RC circuits are connected to each other in series. The multi-stage circuit may be configured to include a parallel path and the like. In addition, the logic gate and the RC circuit may be combined and connected to each other in series. In a case where the RC circuit is used, an ON resistance of a MOS may be used as a resistor, a parasitic capacitor of a MOS may be used as a capacitor, and the RC circuit may be configured such that either one or both of a resistance value of the resistor and a capacitance value of the capacitor may be changeable as illustrated in FIGS. 10B, 10C, and 10D. That is, the RC circuit may be configured to include either one or both of a variable resistor and a variable capacitor.

Figure 11A:
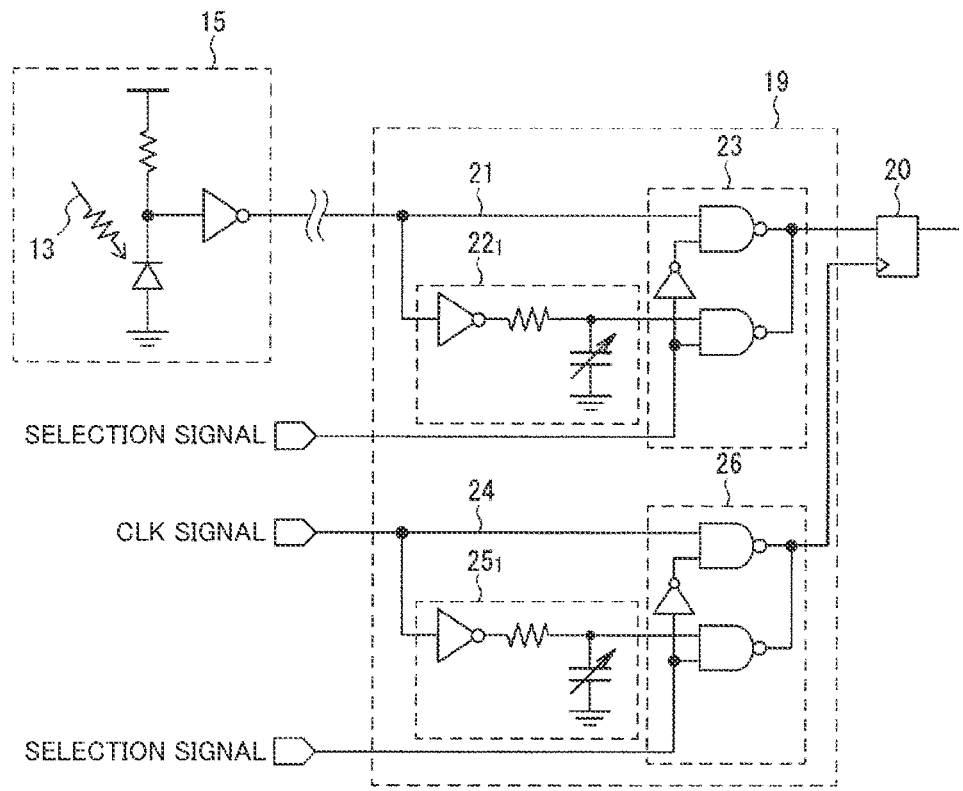
FIG. 11A is a diagram illustrating a variation amplification part in a case where an RC circuit including a variable capacitor is used.
Figure 11B:
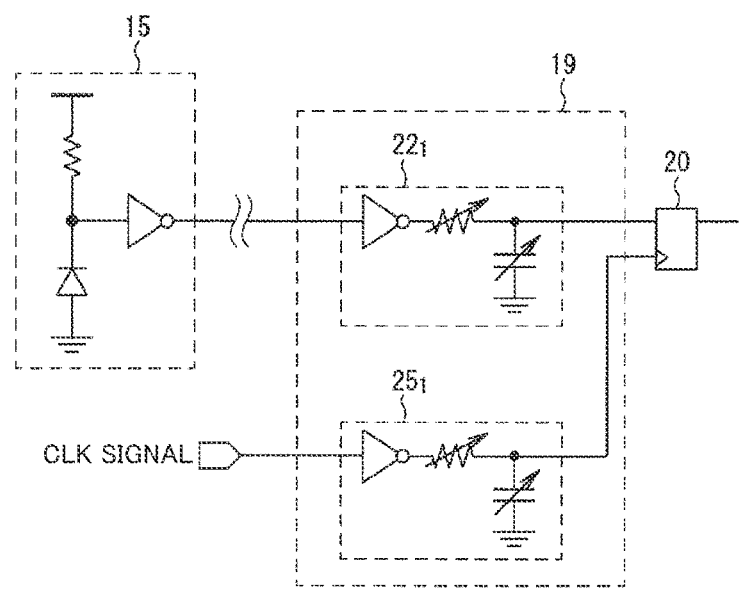
FIG. 11B is a diagram illustrating a variation amplification part in a case where an RC circuit including a variable resistor and a variable capacitor is used.

FIG. 11A illustrates a configuration in which only a capacitance value of a capacitor can be changed, as the first addition parts $22_1$ to $22_n$. Meanwhile, FIG. 11A illustrates a configuration in which only the first addition part $22_1$ is provided as the first addition parts $22_1$ to $22_n$. In addition, FIG. 11B illustrates a configuration in which both a resistance value of a resistor and a capacitance value of a capacitor can be changed, as the first addition parts $22_1$ to $22_n$. FIG. 11B illustrates a configuration in which 0 "Ω" can be selected as the resistance value of the resistor, and 0 "F" can be selected as the capacitance value of the capacitor and a configuration in which the first exclusive operation switch 23 and the second exclusive operation switch 26 illustrated in FIG. 11A are omitted. Meanwhile, FIG. 11B illustrates a configuration in which only the first addition part $22_1$ is provided as the first addition parts $22_1$ to $22_n$.

The first exclusive operation switch 23 is configured to include a plurality of first switches $28_0$ to $28_n$ in which one first switch $28_0$ is any one of 0 to n) is set to be in an ON state, and the remaining first switches $28_0$ to $28_{j-1}$ and $28_{j+1}$ to $28_n$ are set to be in an OFF state. When the first switch $28_0$ is in an ON state, the first switch $28_0$ sets an electrical conduction state between the other end of the first electrical path 21 and an output terminal 29 connected to the synchronizing part 20. When the first switch $28_0$ is in an OFF state, the first switch $28_0$ sets a cutoff state between the other end of the first electrical path 21 and the output terminal 29 connected to the synchronizing part 20. Further, in a case where the first switch $28_i$ is in an ON state, the first switch $28_i$ sets an electrical conduction state between the other end of a first addition part $22_i$ and the output terminal 29 connected to the synchronizing part 20. In a case where the first switch $28_i$ is in an OFF state, the first switch $28_i$ sets a cutoff state between the other end of the first addition part $22_i$ and the output terminal 29 connected to the synchronizing part 20. In addition, the first exclusive operation switch 23 sets any one of the first switches $28_0$ to $28_n$ to be in an ON state in response to a path selection signal received from the control part 5, and outputs either an electrical signal passing through the first electrical path 21 or an electrical signal output from the first addition parts $22_1$ to $22_n$ and having jitter added thereto to the synchronizing part 20. For example, the first exclusive operation switch 23 sets a first switch $28_0$, to be in an ON state in a case where the widths of the bins of the histograms illustrated in FIGS. 5A, 5B, and 5C that are created by the histogram creating part 17 are equal to or less than a predetermined width determined in advance, and outputs an electrical signal passing through the first electrical path 21 to the synchronizing part 20. On the other hand, the first exclusive operation switch 23 sets any one of the first switches $28_1$ to $28_n$ to be in an ON state in a case where the widths of the bins are larger than the predetermined width, and outputs any of electrical signals output from the first addition parts $22_1$ to $22_n$ having jitter added thereto to the synchronizing part 20.

Figure 12A:
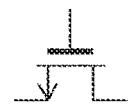
FIG. 12A is a diagram illustrating an NMOS switch.
Figure 12B:
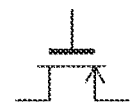
FIG. 12B is a diagram illustrating a PMOS switch.
Figure 12C:
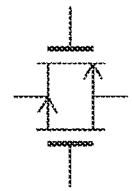
FIG. 12C is a diagram illustrating a CMOS switch.

Each of the first switches $28_0$ and $28_1$ to $28_n$ may be realized by an analog method such as an NMOS switch as illustrated in FIG. 12A, a PMOS switch as illustrated in FIG. 12B, and a CMOS switch as illustrated in FIG. 12C. Meanwhile, in a case where an analog method is used, there is a possibility that jitter of an electrical signal passing through the first electrical path 21 will increase in an ON resistance of a MOS.

Figure 13A:
FIG. 13A is a diagram illustrating a NAND gate.
Figure 13B:
FIG. 13B is a diagram illustrating a NOR gate.

In addition, each of the first switches $28_0$ and $28_1$ to $28_n$ may be realized by a logical method such as a NAND gate as illustrated in FIG. 13A and an NOR gate as illustrated in FIG. 13B. Since an electrical signal output from the light receiving element 15 is already operating with a logic amplitude, it is preferable to use an element having a driving force such as a NAND gate or a NOR gate in terms of characteristics rather than using an NMOS switch or the like. Meanwhile, a logic gate of 2 inputs (a NAND gate, a NOR gate) is illustrated in FIGS. 13A and 13B, but a logic gate of 3 inputs or more may be used.

The second electrical path 24 is a signal line of which one end is connected to an input terminal 30, receiving an input of a CLK signal output from a clock signal generation part, and the other end is connected to one end of a second switch $31_0$ included in the second exclusive operation switch 26. In addition, a CLK signal is output to one end of the second switch $31_0$ included in the second exclusive operation switch 26 through the second electrical path 24.

Figure 14:
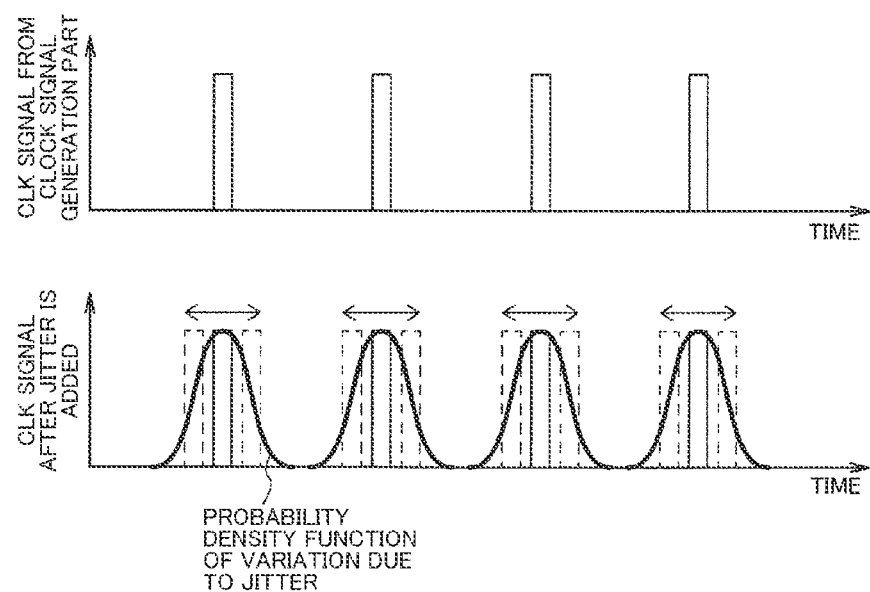
FIG. 14 is a diagram illustrating CLK signals before and after the addition of jitter.

Each of the second addition parts $25_i$ is a signal path which is disposed in parallel with the second electrical path 24 and of which one end is connected to the input terminal 30, receiving an input of a CLK signal from the clock signal generation part 3, and the other end is connected to one end of a second switch $31_i$ included in the second exclusive operation switch 26. In addition, the CLK signal is output to one end of the second switch $31_i$ included in the second exclusive operation switch 26 with jitter (a short variation component generated in a time axis direction) added thereto. In this manner, jitter is added to the CLK signal, and thus the CLK signal after adding jitter varies in a time axis direction in accordance with a probability density function of a variation due to jitter as illustrated in FIG. 14.

Each of the second addition parts $25_1$ to $25_n$ may be configured using one or more of the NOT gate as illustrated in FIG. 8A, the NOR gate as illustrated in FIG. 8B, the AND gate as illustrated in FIG. 8C, and the XOR gate as illustrated in FIG. 8D, similar to the above-described first addition parts $22_1$ to $22_n$. For example, as illustrated in FIG. 9, each of the second addition parts $25_1$ to $25_n$ may be a multiple-stage delay circuit in which a large number of NOT gates are connected to each other in series. Meanwhile, in FIG. 9, a configuration having only the second addition part $25_1$ is illustrated as the second addition parts $25_1$ to $25_n$.

In addition, each of the second addition parts $25_1$ to $25_n$ may be configured using one or more RC circuits as illustrated in FIG. 10A. By using the RC circuit, it is possible to blunt a signal edge and increase jitter. For example, each of the second addition parts $25_1$ to $25_n$ may be a multi-stage circuit in which a large number of RC circuits are connected to each other in series. The multi-stage circuit may be configured to include a parallel path and the like. In addition, the logic gate and the RC circuit may be combined and connected to each other in series. In a case where the RC circuit is used, an ON resistance of a MOS may be used as a resistor, a parasitic capacitor of a MOS may be used as a capacitor, and the RC circuit may be configured such that either one or both of a resistance value of the resistor and a capacitance value of the capacitor may be changeable as illustrated in FIGS. 10B, 10C, and 10D.

FIG. 11A illustrates a configuration in which only a capacitance value of a capacitor can be changed, as the second addition parts $25_1$ to $25_n$. Meanwhile, FIG. 11A illustrates a configuration in which only the second addition part $25_1$ is provided as the second addition parts $25_1$ to $25_n$. In addition, FIG. 11B illustrates a configuration in which both a resistance value of a resistor and a capacitance value of a capacitor can be changed, as the second addition parts $25_1$ to $25_n$. FIG. 11B illustrates a configuration in which 0 "Ω" can be selected as the resistance value of the resistor, and 0 "F" can be selected as the capacitance value of the capacitor and a configuration in which the first exclusive operation switch 23 and the second exclusive operation switch 26 illustrated in FIG. 11A are omitted.

Meanwhile, FIG. 11B illustrates a configuration in which only the second addition part $25_1$ is provided as the second addition parts $25_1$ to $25_n$.

Meanwhile, it is preferable that the configurations of the second addition parts $25_1$ to $25_n$ match the configurations of the first addition parts $22_1$ to $22_n$, but the configurations thereof do not necessarily match each other.

The second exclusive operation switch 26 is configured to include a plurality of second switches $31_0$ to $31_n$ in which one second switch $31_j$ is set to be in an ON state, and the remaining second switches $31_0$ to $31_{j-1}$ and $31_{j+1}$ to $31_n$ are set to be in an OFF state. When the second switch $31_0$ is in an ON state, the second switch $31_0$ sets an electrical conduction state between the other end of the second electrical path 24 and an output terminal 32 connected to the synchronizing part 20. When the second switch $31_0$ is in an OFF state, the second switch $31_0$ sets a cutoff state between the other end of the second electrical path 24 and the output terminal 32 connected to the synchronizing part 20. Further, in a case where the second switch $31_i$ is in an ON state, the second switch $31_i$ sets an electrical conduction state between the other end of a second addition part $25_i$ and the output terminal 32 connected to the synchronizing part 20. In a case where the second switch $31_i$ is in an OFF state, the second switch $31_i$ sets a cutoff state between the other end of the second addition part $25_i$ and the output terminal 32 connected to the synchronizing part 20. In addition, the second exclusive operation switch 26 sets any of the second switches 31₀ to 31ₙ to be in an ON state in response to a path selection signal received from the control part 5, and outputs either a CLK signal passing through the second electrical path 24 or a CLK signal output from the second addition parts 25₁ to 25ₙ and having jitter added thereto to the synchronizing part 20. For example, the second exclusive operation switch 26 sets a second switch 31₀ to be in an ON state in a case where the widths of the bins of the histograms illustrated in FIGS. 5A, 5B, and 5C that are created by the histogram creating part 17 are equal to or less than a predetermined width, and outputs a CLK signal passing through the second electrical path 24 to the synchronizing part 20. On the other hand, the second exclusive operation switch 26 sets any of the second switches 31₁ to 31ₙ to be in an ON state in a case where the widths of the bins are larger than the predetermined width, and outputs any of CLK signals output from the second addition parts 25₁ to 25ₙ and having jitter added thereto to the synchronizing part 20. As a method of realizing the second switches 31₀ to 31ₙ, the analog method as illustrated in FIGS. 12A to 12C and the logical method as illustrated in FIGS. 13A and 13B can be adopted, similar to the first switches 28₀ and 28₁ to 28ₙ.

With such a configuration, the variation amplification part 19 can impart a variation to either one or both of an electrical signal output from the light receiving element 15 and a CLK signal output from the clock signal generation part 3 and amplify a variation in a temporal relative relationship between the electrical signal and the CLK signal.

The synchronizing part 20 is a component that generates a synchronizing signal obtained by synchronizing an electrical signal after a variation is amplified with a CLK signal, on the basis of the electrical signal and the CLK signal after the variation is amplified by the variation amplification part 19. More specifically, the synchronizing part 20 generates a synchronizing signal obtained by synchronizing an electrical signal output from the first exclusive operation switch 23 with a CLK signal output from the second exclusive operation switch 26. The synchronizing part 20 is constituted by, for example, a D flip-flop.

With such a configuration, the TDC 16 can measure a period of time (arrival time) from when the light 7 is emitted from the light source 8 to when the reflected light 13 is received by the light receiving element 15, on the basis of a trigger pulse applied from the control part 5 and a synchronizing signal generated by the synchronizing part 20, and can output a digital value corresponding to the measured period of time (arrival time). As a method of measuring an arrival time, for example, a method of measuring a period of time from when a trigger pulse rises to when a synchronizing signal rises can be adopted.

Figure 5A:
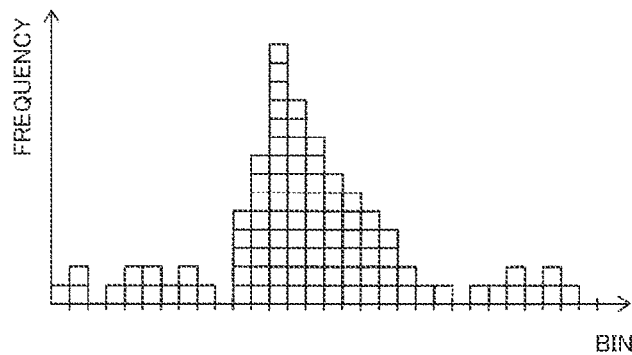
FIG. 5A is a diagram illustrating a histogram in a case where the period of a CLK signal is short.
Figure 5B:
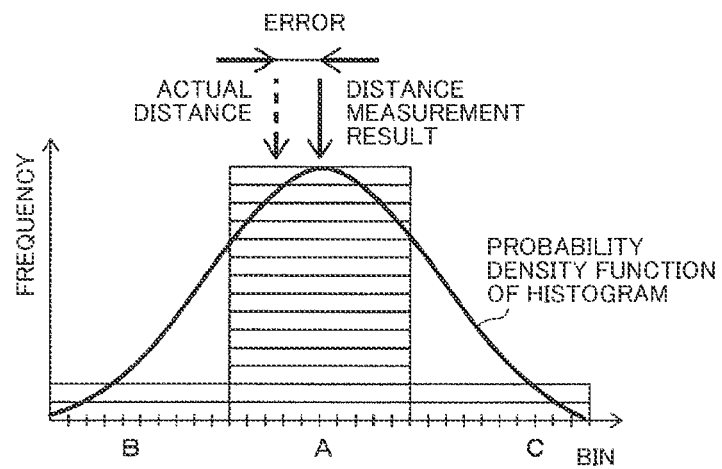
FIG. 5B is a diagram illustrating a histogram in a case where a variation is not amplified.
Figure 5C:
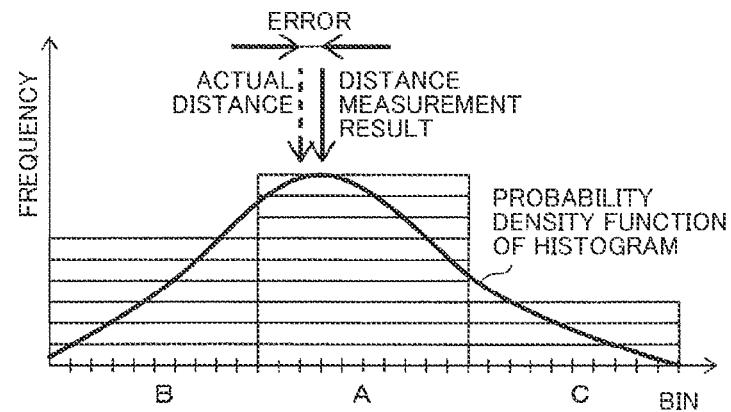
FIG. 5C is a diagram illustrating a histogram in a case where the period of a CLK signal is long.
Figure 6:
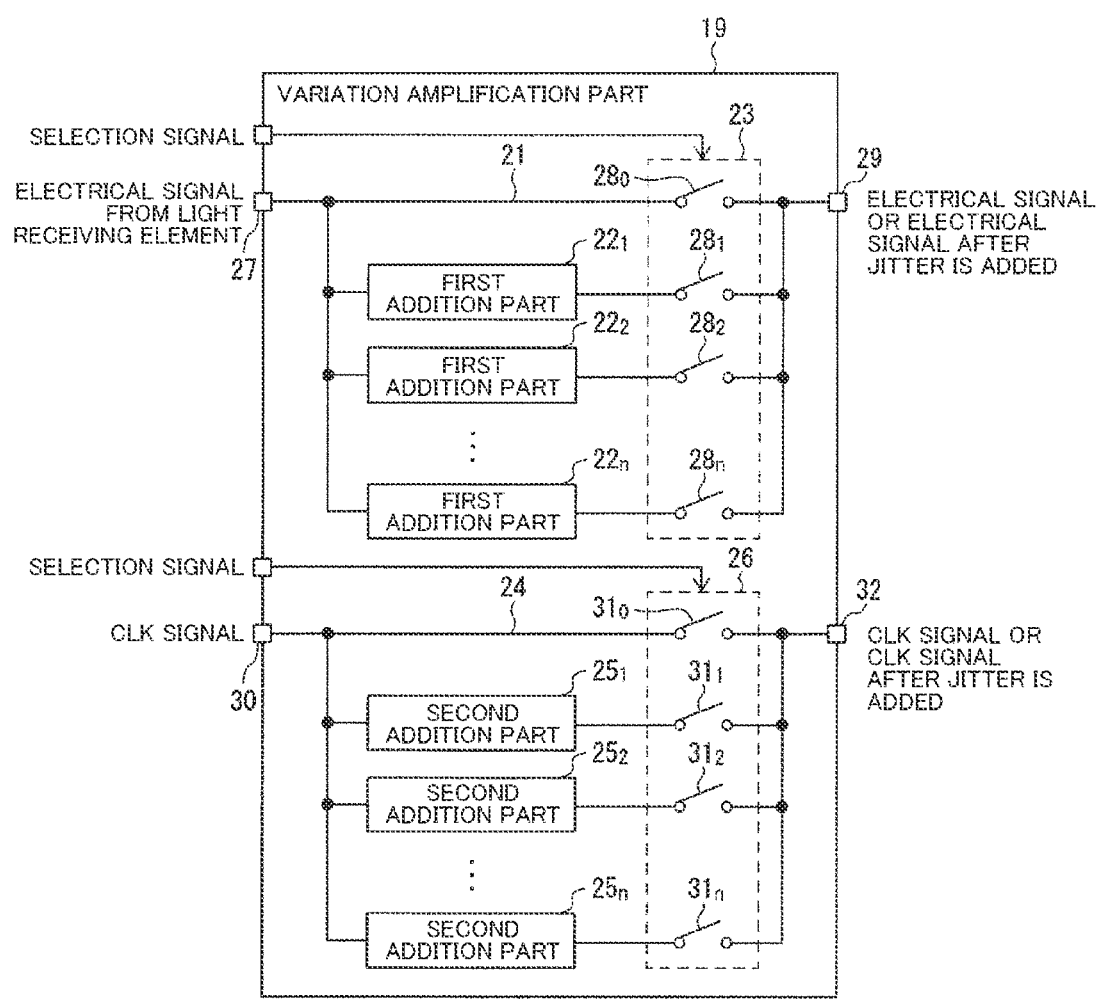
FIG. 6 is a diagram illustrating a configuration of a variation amplification part.

The histogram creating part 17 is a component that creates the histograms as illustrated in FIGS. 5A to 5C by accumulating each digital value (bin) converted by the TDC 16. The histogram of FIG. 5A is a histogram in a case where the frequency of a CLK signal is relatively high. In addition, the histograms of FIGS. 5B and 5C are histograms in a case where the frequency of a CLK signal is 1/10 of the frequency used to create the histogram of FIG. 5A. Among these, FIG. 5B is a histogram based on an electrical signal and a CLK signal in which a variation in a temporal relative relationship is not amplified. In addition, FIG. 5C is a histogram based on an electrical signal and a CLK signal in which a variation in a temporal relative relationship is amplified. As illustrated in FIG. 5C, it is possible to prevent the frequency of a certain section A from becoming significantly higher than the frequencies of other sections B and C in a histogram based on a period of time from when the light 7 is emitted to when the reflected light 13 is received by increasing a variation in a temporal relative relationship between an electrical signal output from the light receiving element 15 and a CLK signal.

The histogram is held as a certain type of data structure or a table on, for example, a memory not illustrated in the drawing. The histogram is created for each light receiving element 15. That is, the histogram is created by the number of light receiving elements 15. The histogram creating part 17 updates the histogram by incrementing the value of a corresponding bin whenever a digital value output from the TDC 16 is received. The histogram created by the histogram creating part 17 is referred to by the distance calculation part 18.

The distance calculation part 18 is a component that detects a peak value (digital value) in the histogram with reference to the histograms created by the histogram creating part 17 and calculates a distance to the object 12 from an arrival time corresponding to the detected peak value (digital value). As a method of detecting a peak value, for example, a probability density function such as an ex-Gaussian distribution is fitted to a histogram, and a peak value indicated by the probability density function obtained by the fitting can be adopted. In addition, when the reflected light 13, which is the emitted light 7 reflected from the object 12, is received, an arrival time is a round trip time to the object 12, and thus it is possible to calculate a distance to the object 12 for each light receiving element 15 by multiplying the arrival time by c/2 (c is the speed of light). In addition, it is possible to obtain a distance image on the basis of a distance calculated for each of the plurality of light receiving elements 15. Data (distance measurement data) regarding the distance image is output to the communication IF part 6.

The control part 5 is a component that controls the overall operation of the distance measuring device. The control part 5 is constituted by, for example, a microprocessor. The control part 5 outputs a trigger pulse for emitting the light 7 to the light source 8 whenever a predetermined light emission period elapses. In addition, the control part 5 outputs a control signal for setting the frequency of a CLK signal to the clock signal generation part 3. The control signal is output whenever the presence or absence of an obstacle around, for example, a vehicle having the distance measuring device mounted thereon changes. In addition, the control part 5 outputs a path selection signal to the first exclusive operation switch 23 and the second exclusive operation switch 26. The path selection signal is output, for example, when the frequency of a CLK signal is switched.

The communication IF part 6 is an interface circuit for outputting distance measurement data calculated by the distance calculation part 18 to an external host IC. The communication IF part 6 may be, for example, an interface circuit based on a mobile industry processor interface (MIPI), a serial peripheral interface (SPI), or an inter-integrated circuit (I2C), or may be configured by mounting some of these interface circuits.

1-2 Operations of Distance Measuring Device

Figure 15:
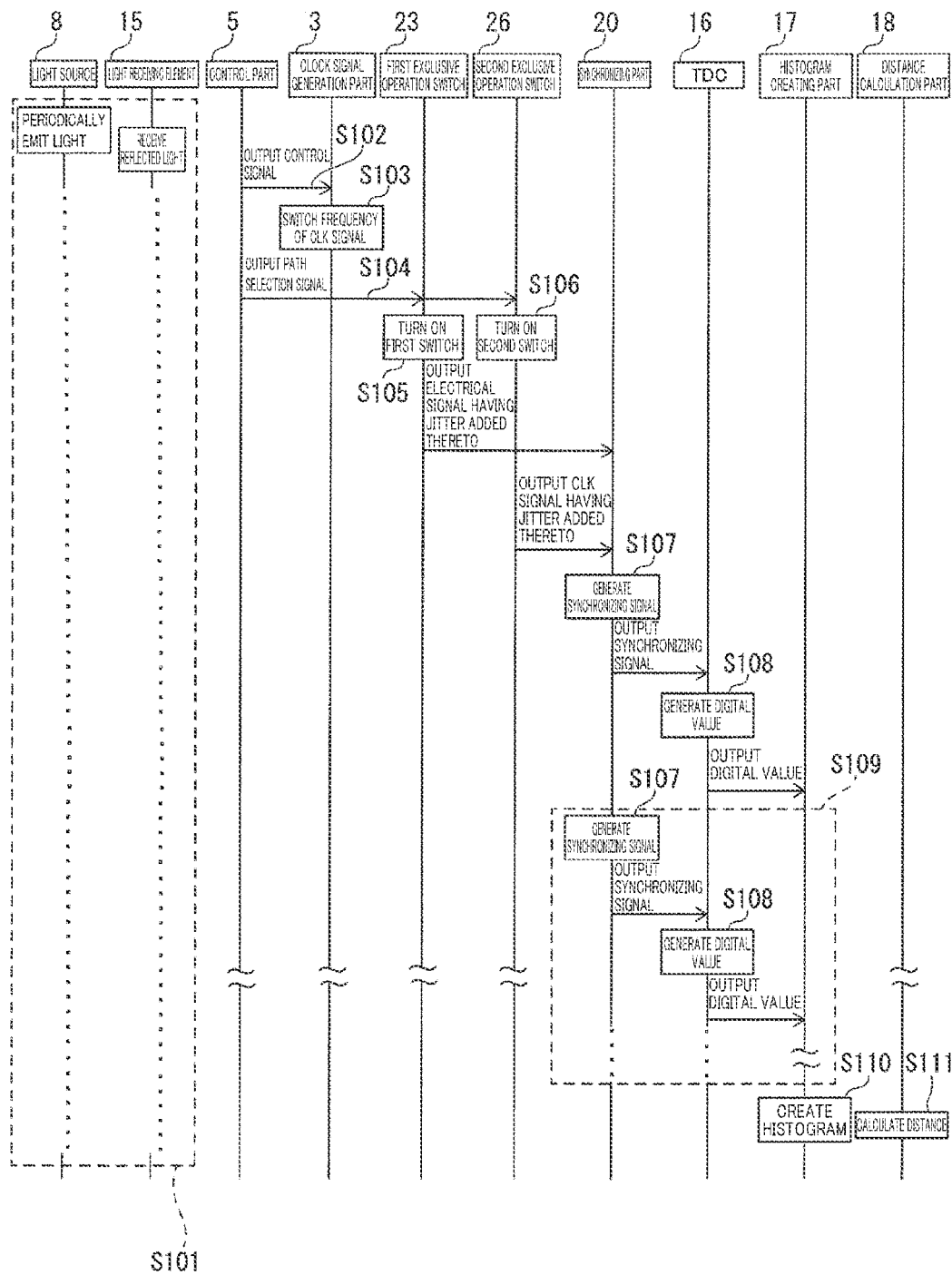
FIG. 15 is a sequence diagram illustrating operations of the distance measuring device according to the first embodiment of the present disclosure.

Next, operations (distance measuring method) of the distance measuring device according to the first embodiment of the present disclosure will be described. FIG. 15 is a sequence diagram illustrating operations of the distance measuring device according to the first embodiment.

First, when ToF distance measurement is executed, the light source 8 is driven in response to a trigger pulse applied from the control part 5 and periodically emits the light 7, the reflected light 13 which is the emitted light 7 reflected from an object is received by the light receiving element 15, and electrical signals are output one after another (step S101).

Here, obstacles disappear from the surroundings of the vehicle or the like equipped with the distance measuring device, and highly accurate distance measurement becomes unnecessary. As a result, it is assumed that the control part 5 outputs a control signal having a low value of a frequency of a CLK signal to the clock signal generation part 3 as illustrated in FIG. 15 (step S102). Then, the clock signal generation part 3 switches the frequency of the CLK signal to a low value in response to the control signal (step S103). In addition, when the frequency of the CLK signal is switched, the control part 5 outputs a path selection signal to the first exclusive operation switch 23 and the second exclusive operation switch 26 (step S104). Then, the first exclusive operation switch 23 sets any one (for example, the first switch $28_1$) of the first switches $28_1$ to $28_n$ to be in an ON state in response to the path selection signal (step S105). Thereby, an electrical signal output from the first addition part $22_1$ and having jitter added thereto (an electrical signal output from the light receiving element 15) is output to the synchronizing part 20.

At the same time, the second exclusive operation switch 26 sets any one (for example, the second switch $31_1$) of the second switches $31_1$ to $31_n$ to be in an ON state in response to a path selection signal (step S106). Thereby, a CLK signal output from the second addition part $25_1$ and having jitter added thereto (a CLK signal generated by the clock signal generation part 3) is output to the synchronizing part 20. For this reason, a variation in a temporal relative relationship between the electrical signal and the CLK signal is amplified.

Subsequently the synchronizing part 20 generates a synchronizing signal obtained by synchronizing the electrical signal output from the first exclusive operation switch 23 with the CLK signal output from the second exclusive operation switch 26 (step S107). Subsequently the TDC 16 measures an arrival time from when the light 7 is emitted from the light source 8 to when the reflected light 13 is received by the light receiving element 15 on the basis of the trigger pulse applied from the control part 5 and the synchronizing signal generated by the synchronizing part 20, and generates a digital value corresponding to the measured arrival time (step S108). Thereby a variation in the digital value is amplified.

Thereafter, a flow of steps S107 to S108 described above is repeated to generate new synchronizing signals one after another for each light 7 which is periodically emitted and for each light receiving element 15, and digital values corresponding to arrival times are generated one after another on the basis of the generated synchronizing signals (step S109).

Subsequently the histogram creating part 17 creates a histogram by accumulating each digital value (bin) converted by the TDC 16 (step S110). Thereby, as illustrated in FIG. 5C, in the histogram, the frequency of a section A to which a true value of a distance belongs is reduced, and the frequency of a section B which is closer to the actual distance, out of the sections 13 and C adjacent to the section A, is further increased.

Subsequently, the distance calculation part 18 detects a peak value (digital value) in the histogram with reference to the created histograms, and calculates a distance from an arrival time corresponding to the detected peak value (digital value) to the object 12 (step S111). Thereby as illustrated in FIG. 5C, it is possible to measure a distance to the object 12 with higher resolution than the width of the section A by fitting a probability density function such as an ex-Gaussian distribution to the histogram and using the peak of the ex-Gaussian distribution indicated by a function obtained by the fitting as a result of the distance measurement.

In addition, a distance image of the object 12 is obtained by repeating a flow of steps S107 to S109 described above for all of the light receiving elements 15 by operating a scanning mechanism, or the like.

As described above, the distance measuring device according to the first embodiment includes the variation amplification part 19 that amplifies a variation in a temporal relative relationship between an electrical signal output from the light receiving element 15 and a CLK signal. In addition, first, the synchronizing part 20 generates a synchronizing signal by synchronizing the electrical signal with the CLK signal after the variation is amplified by the variation amplification part 19, on the basis of the electrical signal and the CLK signal. Subsequently, the histogram creating part 17 creates a histogram based on a period of time from when the light source 8 emits the light 7 to when the light receiving element 15 receives the reflected light 13, on the basis of the synchronizing signal generated by the synchronizing part 20. Subsequently the distance calculation part 18 calculates a distance to the object 12 on the basis of the histogram created by the histogram creating part 17. For this reason, when an internal frequency is lowered, that is, the frequency of the CLK signal is lowered to reduce power consumption, a variation in a temporal relative relationship between the electrical signal output from the light receiving element 15 and the CLK signal is increased, and thus it is possible to prevent the frequency of a certain section A from becoming significantly higher than the frequencies of other sections B and C in the histogram based on the period of time from when the light 7 is emitted to when the reflected light 13 is received as illustrated in FIG. 5C.

That is, it is possible to reduce the frequency of a certain section A and further increase the frequency of the section B which is closer to the actual distance, out of the sections B and C adjacent to the section A, as compared to a histogram in a case where a variation in a temporal relative relationship between an electrical signal and a CLK signal is not amplified as illustrated in FIG. 5B. As a result, for example, it is possible to measure a distance to the object 12 with higher resolution than the width of the section A by fitting a probability density function such as an ex-Gaussian distribution to the histogram and using the peak of the ex-Gaussian distribution indicated by a function obtained by the fitting as a result of the distance measurement. Thus, it is possible to provide a distance measuring device capable of improving the accuracy of measurement while reducing power consumption.

Meanwhile, the effects described in the present specification are merely examples and are not limited, and there may be other effects.

Further, in the distance measuring device according to the first embodiment, the variation amplification part 19 adds jitter to at least one of an electrical signal output from the light receiving element 15 and a CLK signal. For this reason, it is possible to easily amplify a variation in a temporal relative relationship between the electrical signal and the CLK signal.

Further, the distance measuring device according to the first embodiment includes the first addition parts $22_1$ to $22_n$ which receives an input of an electrical signal and outputs the electrical signal having jitter added thereto, and the second addition parts $25_1$ to $25_n$ which receives an input of a CLK signal and outputs the CLK signal having jitter added thereto. For this reason, when the first addition parts $22_1$ to $22_n$ add jitter to an electrical signal output from the light receiving element 15 as illustrated in FIG. 7, the electrical signal after the addition of jitter varies in a time axis direction in accordance with a probability density function of a variation due to the added jitter. In addition, when the second addition parts $25_1$ to $25_n$ add jitter to a CLK signal as illustrated in FIG. 14, the CLK signal after the addition of jitter varies in accordance with a probability density function of a variation due to the added jitter.

Further, in the distance measuring device according to the first embodiment, each of the first addition parts $22_1$ to $22_n$ and the second addition parts $25_1$ to $25_n$ includes at least one or more logic gates and RC circuits. For this reason, it is possible to easily configure the first addition parts $22_1$ to $22_n$ and the second addition parts $25_1$ to $25_n$.

Further, in the distance measuring device according to the first embodiment, logic gates are connected to each other in series to configure a multiple-stage delay circuit. For this reason, it is possible to further increase jitter.

Further, in the distance measuring device according to the first embodiment, the resistor of the RC circuit is configured as a variable resistor. For this reason, it is not necessary to prepare a plurality of first addition parts $22_1$ to $22_n$ and a plurality of second addition parts $25_1$ to $25_n$.

Further, in the distance measuring device according to the first embodiment, the capacitor of the RC circuit is configured as a variable capacitor. For this reason, it is not necessary to prepare a plurality of first addition parts $22_1$ to $22_n$ and a plurality of second addition parts $25_1$ to $25_n$.

Further, the distance measuring device according to the first embodiment includes the first electrical path 21 that is disposed in parallel with the first addition parts $22_1$ to $22_n$ and transmits an electrical signal output from the light receiving element 15, and the first exclusive operation switch 23 that outputs either one of an electrical signal output from the first addition parts $22_1$ to $22_n$ and having jitter added thereto and an electrical signal passing through the first electrical path 21 to the synchronizing part 20. In addition, the distance measuring device includes the second electrical path 24 that is disposed in parallel with the second addition parts $25_1$ to $25_n$ and transmits a CLK signal, and the second exclusive operation switch 26 that outputs either one of a CLK signal output from the second addition parts $25_1$ to $25_n$ and having jitter added thereto and a CLK signal passing through the second electrical path 24 to the synchronizing part 20. In addition, the synchronizing part 20 generates a synchronizing signal by synchronizing the electrical signal output from the first exclusive operation switch 23 with the CLK signal output from the second exclusive operation switch 26. For this reason, it is possible to easily generate various synchronizing signals such as a synchronizing signal obtained by adding jitter to only the electrical signal, a synchronizing signal obtained by adding jitter to only the CLK signal, and a synchronizing signal obtained by adding jitter to both the signals.

Further, in the distance measuring device according to the first embodiment, the first exclusive operation switch 23 outputs an electrical signal passing through the first electrical path 21 to the synchronizing part 20 in a case where the width of a bin of a histogram is equal to or less than a predetermined width determined in advance. In addition, the second exclusive operation switch 26 outputs an electrical signal passing through the second electrical path 24 to the synchronizing part 20 in a case where the width of a bin of a histogram is equal to or less than a predetermined width determined in advance. For this reason, in a case where the width of the bin of the histogram is small and the accuracy of measurement is high, a variation does not need to be amplified, and it is possible to prevent the accuracy of measurement from being decreased.

Further, in the distance measuring device according to the first embodiment, each of the first exclusive operation switch 23 and the second exclusive operation switch 26 includes any of an NMOS switch, a PMOS switch, a CMOS switch, a NAND gate, and a NOR gate. For this reason, the first exclusive operation switch 23 and the second exclusive operation switch 26 can be easily configured.

Further, in the distance measuring device according to the first embodiment, the variation amplification part 19 sets the amount of amplitude of a variation to ⅓ or more and ½ or less of the width of a bin of a histogram. For this reason, it is possible to reduce the frequency of a certain section A of the histogram and increase the frequencies of sections B and C adjacent to the section A.

1-3 Modification Example

Figure 16:
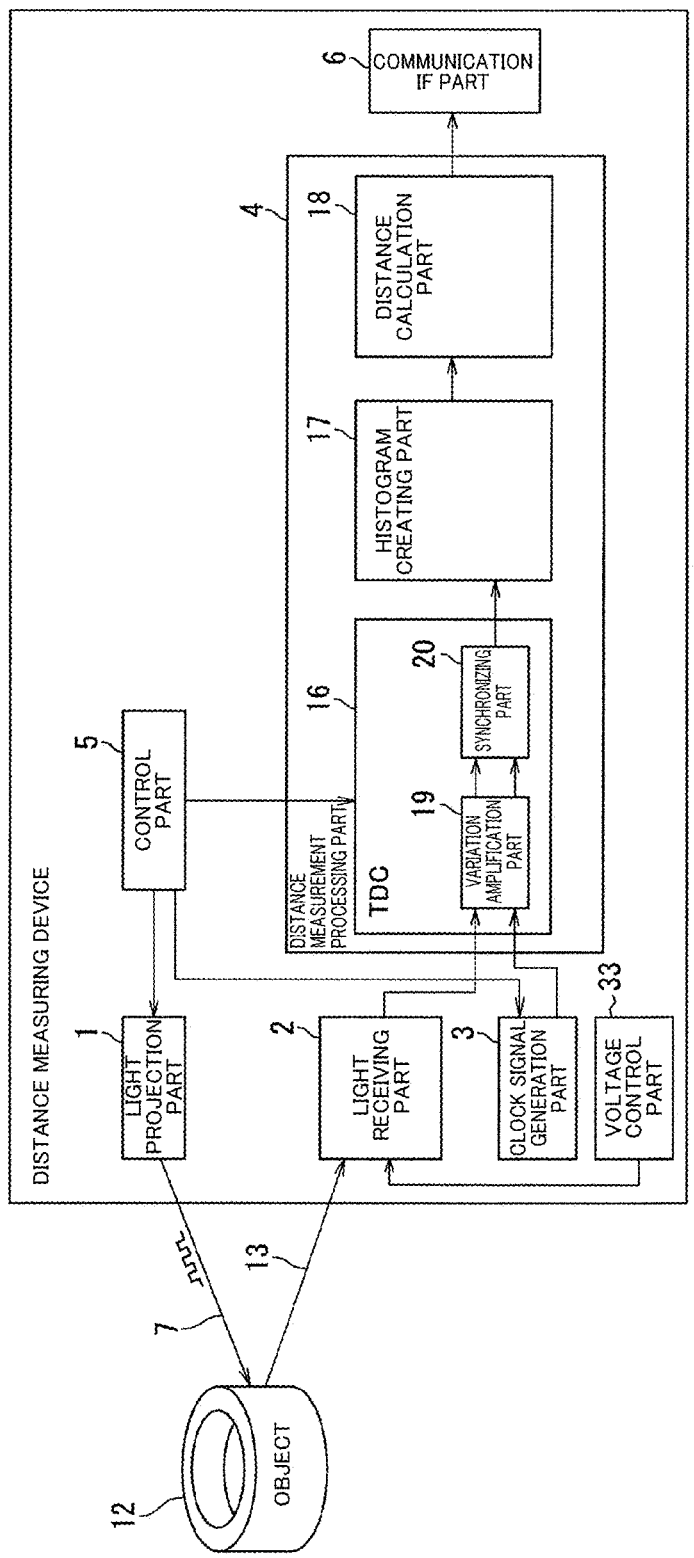
FIG. 16 is a diagram illustrating an overall configuration of a distance measuring device according to a modification example.
Figure 17:
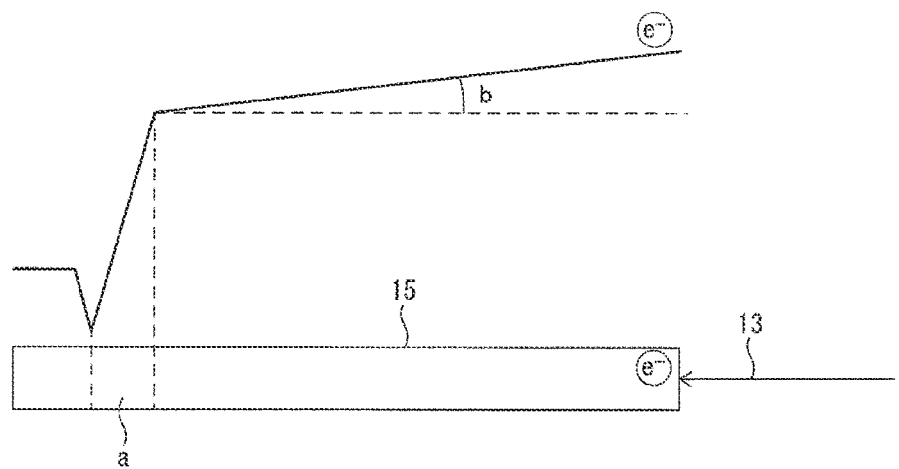
FIG. 17 is a diagram illustrating the potential of a SPAD.

Meanwhile, in the distance measuring device according to the first embodiment, an example in which the first addition parts $22_1$ to $22_n$ are used as the variation amplification part 19 in order to add jitter to an electrical signal output from the light receiving element 15 has been described, but other configurations can also be adopted. For example, a voltage control part 33 that controls a voltage between an anode and a cathode of an SPAD which is the light receiving element 15 so that jitter is added to an electrical signal as illustrated in FIG. 16 may be used as the variation amplification part 19. By controlling the voltage between the anode and the cathode, it is possible to adjust a tilt angle "b" at which electrons ejected by the received reflected light 13 are rolled to a region "a" where an avalanche is generated in the potential of the SPAD as illustrated in FIG. 17. For example, it is possible to increase a period of time until an avalanche is generated and to increase jitter as the tilt angle "b" becomes smaller, and it is possible to reduce a period of time until an avalanche is generated and to reduce jitter as the tilt angle "b" becomes larger.

Figure 18:
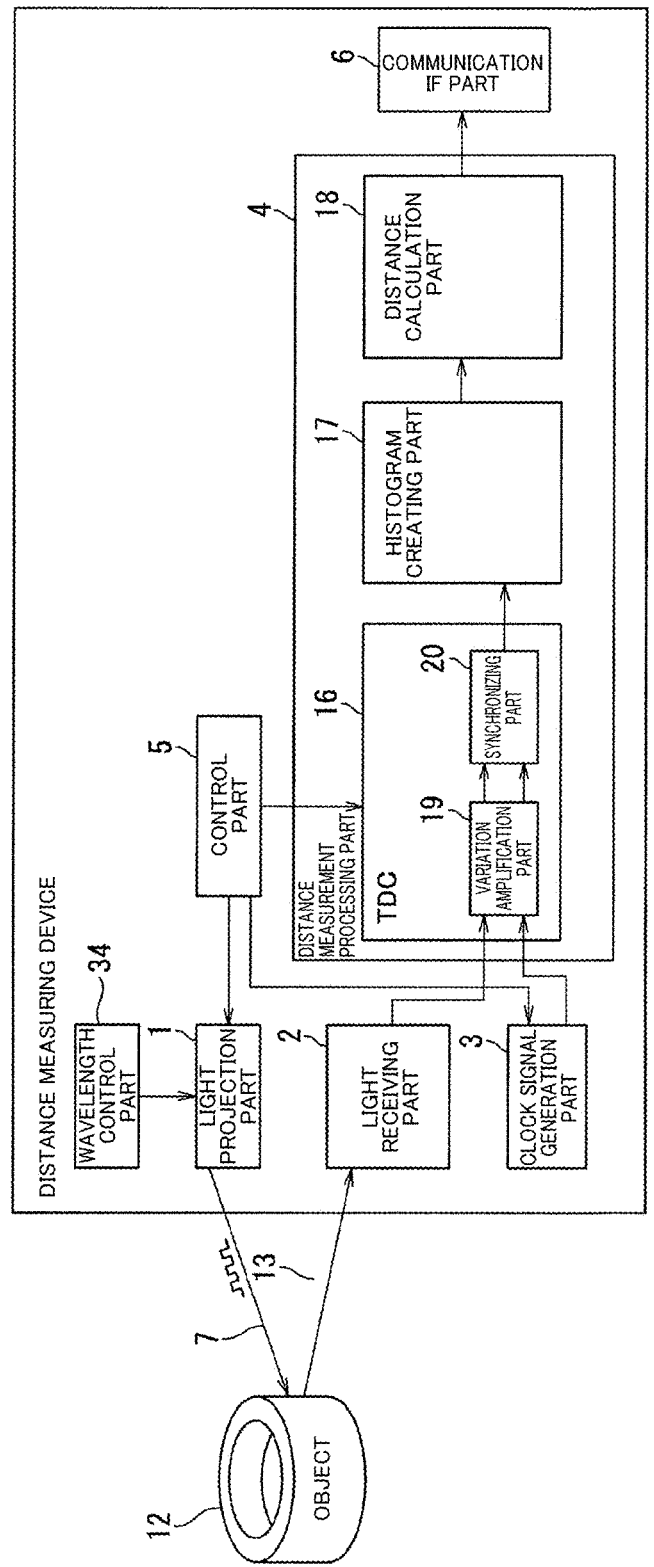
FIG. 18 is a diagram illustrating an overall configuration of a distance measuring device according to a modification example.
Figure 19:
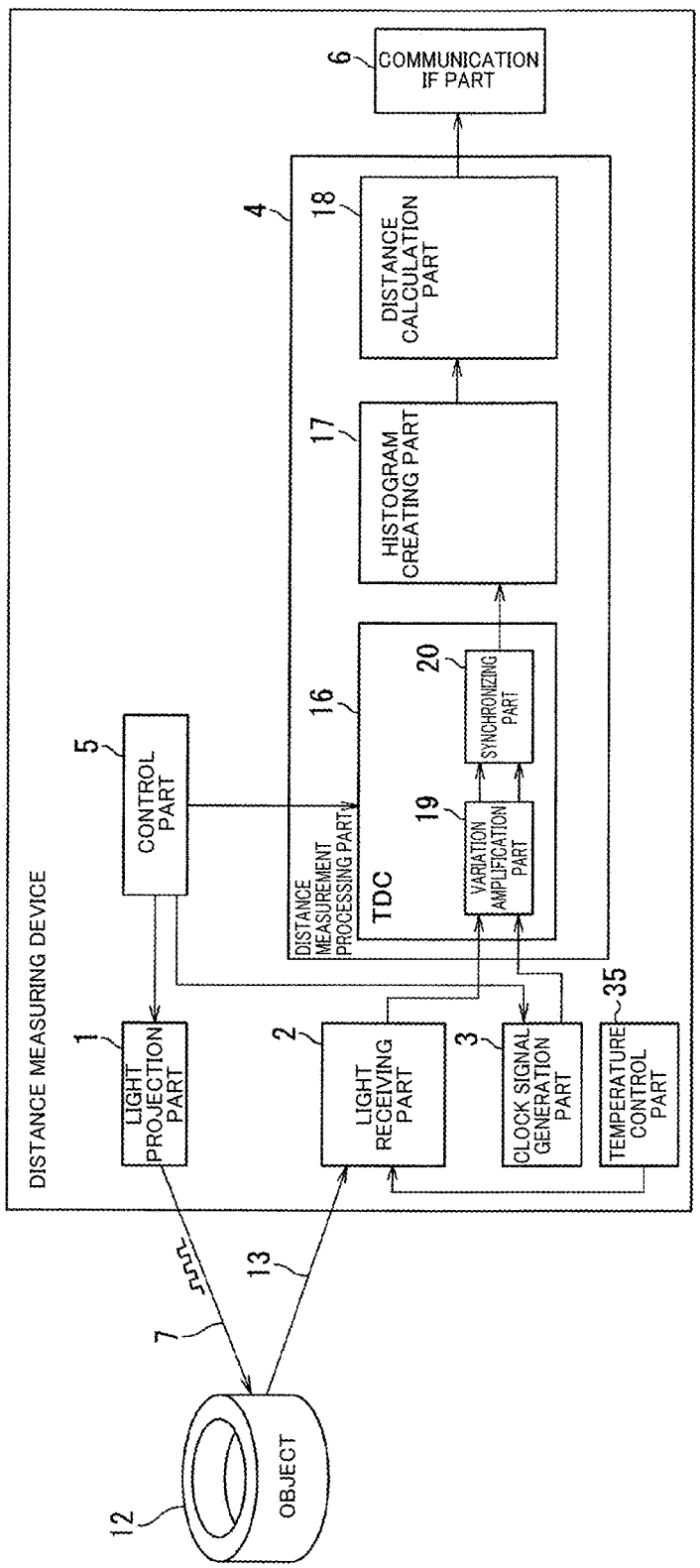
FIG. 19 is a diagram illustrating an overall configuration of a distance measuring device according to a modification example.

In addition, for example, a wavelength control part 34 that controls the wavelength of the light 7 emitted by the light source 8 so that jitter is added to an electrical signal as illustrated in FIG. 18 may be used as the variation amplification part 19. Further, for example, a temperature control part 35 that controls the temperature of the light receiving element 15 so that jitter is added to an electrical signal as illustrated in FIG. 19 may be used as the variation amplification part 19.

2. Application Example

The technique according to the present disclosure can be applied to various products. For example, the technique according to the present disclosure may be realized as a device mounted on any type of mobile body such as an automobile, an electric vehicle, a hybrid electric vehicle, a motorcycle, a bicycle, a personal mobility an airplane, a drone, a ship, a robot, construction machinery, or agricultural machinery (a tractor).

Figure 20:
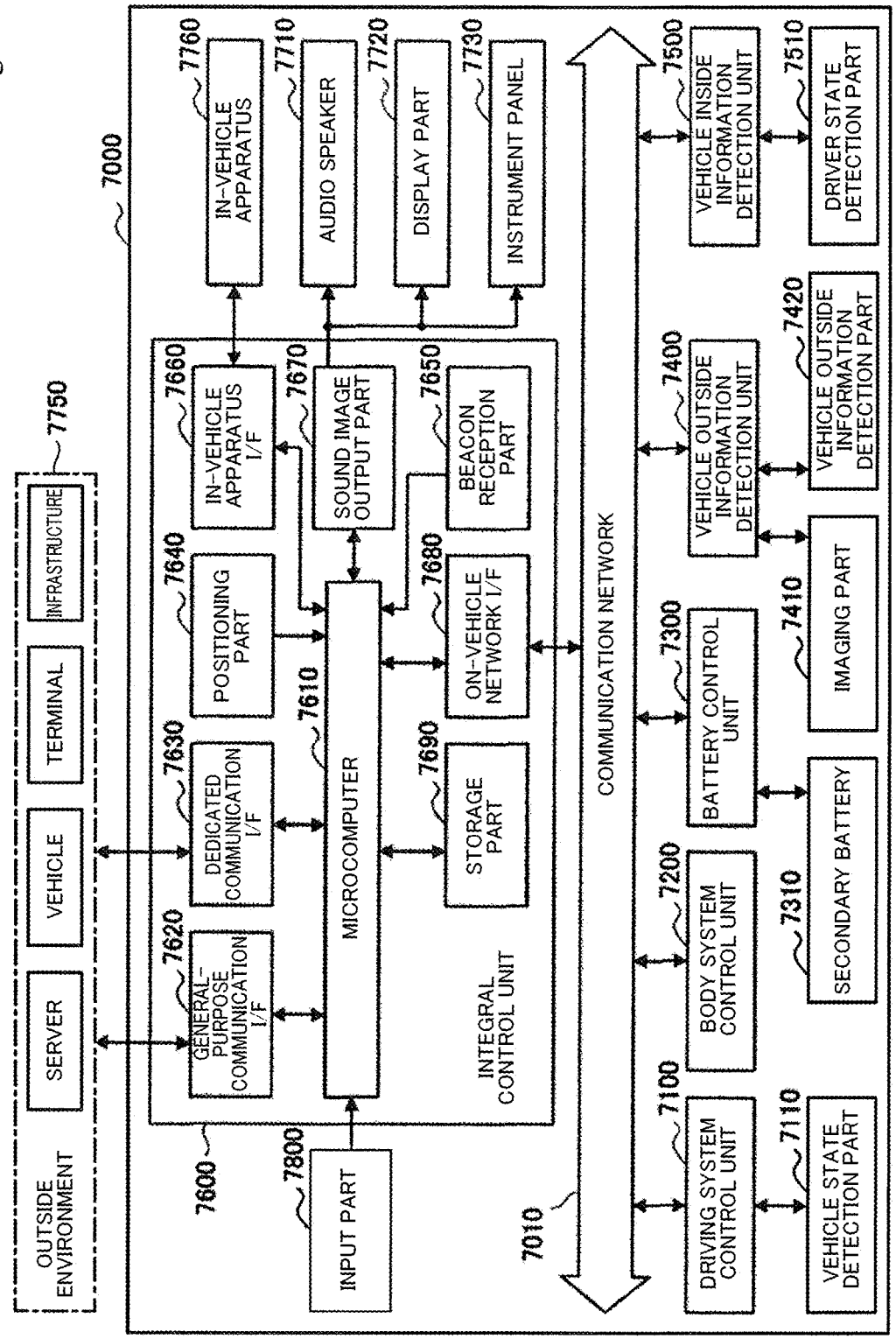
FIG. 20 is a diagram illustrating an overall configuration of a mobile body control system according to an application example.

FIG. 20 is a block diagram illustrating a schematic configuration example of a vehicle control system 7000 which is an example of a mobile body control system to which the technique according to the present disclosure is applicable. The vehicle control system 7000 includes a plurality of electronic control units that are connected to each other through a communication network 7010. In the example illustrated in FIG. 20, the vehicle control system 7000 includes a driving system control unit 7100, a body system control unit 7200, a battery control unit 7300, a vehicle outside information detection unit 7400, a vehicle inside information detection unit 7500, and an integral control unit 7600. The communication network 7010 for connecting the plurality of control units may be an on-vehicle communication network based on any standard such as a controller area network (CAN), a local interconnect network (LIN), a local area network (LAN), or FlexRay (registered trademark).

The control units include a microcomputer that performs arithmetic processing in accordance with various programs, a storage part that stores programs executed by the microcomputer, parameters used for various arithmetic operations, and the like, and a driving circuit that drives various devices to be controlled. The control units include a network I/F for performing communication with other controls units through the communication network 7010, and includes a communication I/F for performing communication with devices inside and outside a vehicle, a sensor, or the like in a wired or wireless manner. In FIG. 20, a microcomputer 7610, a general-purpose communication I/F 7620, a dedicated communication I/F 7630, a positioning part 7640, a beacon reception part 7650, an in-vehicle apparatus I/F 7660, a sound image output part 7670, an on-vehicle network I/F 7680, and a storage part 7690 are illustrated as functional components of the integral control unit 7600. Similarly, the other control units also include a microcomputer, a communication I/F, a storage part, and the like. The driving system control unit 7100 controls operations of devices related to a driving system of a vehicle in accordance with various programs. For example, the driving system control unit 7100 functions as control devices such as a driving force generator for generating a driving force of a vehicle such as an internal combustion engine or a driving motor, a driving force transmission mechanism for transmitting a driving force to wheels, a steering mechanism for adjusting a steering angle of the vehicle, and a braking device that generates a braking force of the vehicle. The driving system control unit 7100 may have a function as a control device such as an antilock brake system (ABS) or an electronic stability control (ESC).

A vehicle state detection part 7110 is connected to the driving system control unit 7100. The vehicle state detection part 7110 includes at least one of for example, a gyro sensor that detects an angular velocity of axial rotation of a vehicle body, an acceleration sensor that detects the acceleration of the vehicle, or a sensor for detecting the amount of operation of an accelerator pedal, the amount of operation of a brake pedal, a steering angle of a steering wheel, an engine speed, or a wheel rotation speed. The driving system control unit 7100 performs arithmetic processing using a signal which is input from the vehicle state detection part 7110 to control an internal combustion engine, a driving motor, an electric power steering device, a brake device, or the like.

The body system control unit 7200 controls operations of various devices mounted on the vehicle body in accordance with various programs. For example, the body system control unit 7200 functions as a keyless entry system, a smart key system, a power window device, or a control device for various lamps such as headlamps, back lamps, brake lamps, turn signals, and fog lamps. In this case, radio waves transmitted from a portable device that substitutes for a key or signals of various switches may be input to the body system control unit 7200. The body system control unit 7200 receives the input of the radio waves or the signals and controls a vehicle door lock device, a power window device, lamps, and the like.

The battery control unit 7300 controls a secondary battery 7310 which is a power supply source of a driving motor in accordance with various programs. For example, information such as a battery temperature, a battery output voltage, or a remaining capacity of a battery is input to the battery control unit 7300 from a battery device including the secondary battery 7310. The battery control unit 7300 performs arithmetic processing using these signals to perform temperature adjustment control of the secondary battery 7310 or the control of a cooling device included in the battery device, or the like.

The vehicle outside information detection unit 7400 detects information on the outside of a vehicle equipped with the vehicle control system 7000. For example, at least one of an imaging part 7410 and a vehicle outside information detection part 7420 is connected to the vehicle outside information detection unit 7400. The imaging part 7410 includes at least, one of a time of flight (ToF) camera, a stereo camera, a monocular camera, an infrared camera, and other cameras. The vehicle outside information detection part 7420 includes, for example, at least one of an environmental sensor for detecting the present weather or weather conditions, and an ambient information detection sensor for detecting other vehicles, obstacles or pedestrians around the vehicle equipped with the vehicle control system 7000.

The environmental sensor may be, for example, at least one of a raindrop sensor that detects rainy weather, a fog sensor that detects fog, a sunshine sensor that detects the degree of sunshine, and a snow sensor that detects snowfall. The ambient information detection sensor may be at least one of an ultrasound sensor, a radar device, and a light detection and ranging, laser imaging detection and ranging (LIDAR) device. The imaging part 7410 and the vehicle outside information detection part 7420 may be provided as independent sensors or devices, or may be provided as a device in which a plurality of sensors or device are integrated.

Figure 21:
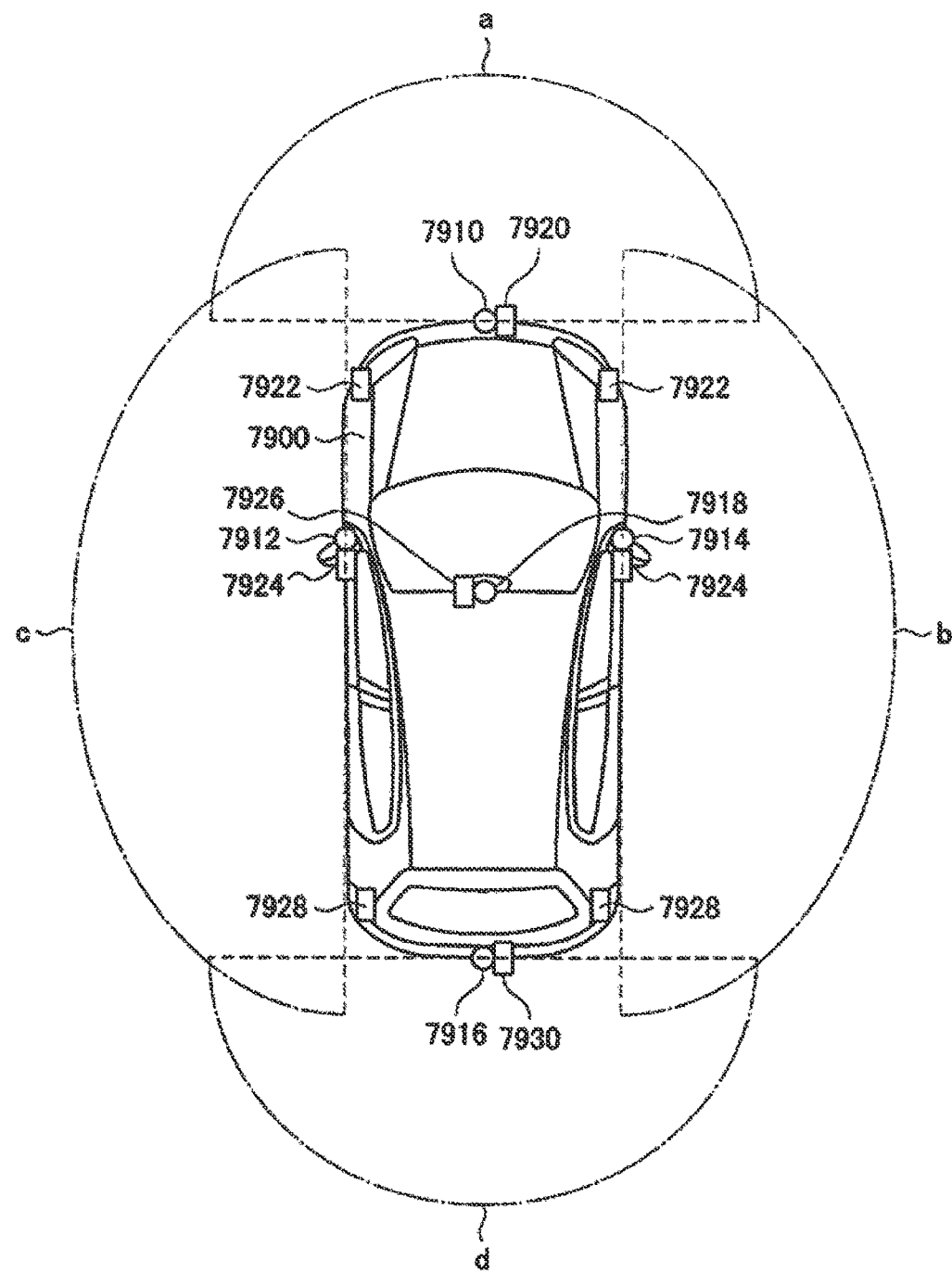
FIG. 21 is a diagram illustrating installation positions of an imaging part and a vehicle outside information detection part.

Here, FIG. 21 illustrates an example of installation positions of the imaging part 7410 and the vehicle outside information detection part 7420. Imaging parts 7910, 7912, 7914, 7916, and 7918 are provided at at least one position of a front nose, side mirrors, a rear bumper, a back door, and an upper portion of a windshield in a vehicle interior of a vehicle 7900. The imaging part 7910 provided on the front nose and the imaging part 7918 provided on the upper portion of the windshield in the vehicle interior mainly acquire an image of the front side of the vehicle 7900. The imaging parts 7912 and 7914 included in the side mirrors mainly acquire an image of the side of the vehicle 7900. The imaging part 7916 included in the rear bumper or the back door mainly acquires an image of the back side of the vehicle 7900. The imaging part 7918 included on the upper portion of the windshield in the vehicle interior is mainly used to detect preceding vehicles, pedestrians, obstacles, traffic lights, traffic signs, lanes, and the like.

Meanwhile, FIG. 21 illustrates an example of imaging ranges of the respective imaging parts 7910, 7912, 7914, and 7916. An imaging range "a" indicates an imaging range of the imaging part 7910 provided at the front nose, imaging ranges "b" and "c" respectively indicate imaging ranges of the imaging parts 7912 and 7914 provided at the side mirrors, and an imaging range "d" indicates an imaging range of the imaging part 7916 provided at the rear bumper or the back door. For example, pieces of image data captured by the imaging parts 7910, 7912, 7914, and 7916 are superimposed on each other, and thus a bird's-eye view image of the vehicle 7900 as viewed from above is obtained.

Vehicle outside information detection parts 7920, 7922, 7924, 7926, 7928, and 7930 respectively provided at the front, rear, side, and corner, and on the upper portion of the windshield in the vehicle interior of the vehicle 7900 may be, for example, ultrasound sensors or radar devices. The vehicle outside information detection parts 7920, 7926, and 7930 respectively provided at the front nose, rear bumper, and back door, and on the upper portion of the windshield in the vehicle interior of the vehicle 7900 may be, for example, LIDAR devices. These vehicle outside information detection parts 7920 to 7930 are mainly used to detect preceding vehicles, pedestrians, obstacles, or the like.

Description will be continued referring back to FIG. 20. The vehicle outside information detection unit 7400 causes the imaging part 7410 to capture an image of the outside of the vehicle and receives the captured image data. In addition, the vehicle outside information detection unit 7400 receives detected information from the vehicle outside information detection part 7420 connected thereto. In a case where the vehicle outside information detection part 7420 is an ultrasound sensor, a radar device, or a LIDAR device, the vehicle outside information detection unit 7400 transmits ultrasonic waves, electromagnetic waves, or the like, and receives information on received reflected waves. The vehicle outside information detection unit 7400 may perform object detection processing for detecting persons, vehicles, obstacles, signs, or characters on a road surface, or distance detection processing on the basis of received information. The vehicle outside information detection unit 7400 may perform environment recognition processing for recognizing rainfall, fog, road surface conditions, or the like on the basis of received information. The vehicle outside information detection unit 7400 may calculate a distance to an object outside the vehicle on the basis of received information.

In addition, the vehicle outside information detection unit 7400 may perform image recognition processing for recognizing persons, vehicles, obstacles, signs, characters on a road surface, and the like or distance detection processing on the basis of received information. The vehicle outside information detection unit 7400 may perform processing such as distortion correction or alignment on the received image data, and synthesize the image data captured by different imaging parts 7410 to generate a bird's-eye view image or a panoramic image. The vehicle outside information detection unit 7400 may perform viewpoint conversion processing using the image data captured by the different imaging parts 7410.

The vehicle inside information detection unit 7500 detects information on the inside of a vehicle. For example, a driver state detection part 7510 that detects the state of a driver is connected to the vehicle inside information detection unit 7500. The driver state detection part 7510 may include a camera that captures an image of a driver, a biological sensor that detects biological information of a driver, a microphone that collects sounds inside a vehicle, or the like. The biological sensor is provided on, for example, a seat surface, a steering wheel, or the like and detects biometric information of an occupant sitting on a seat or a driver holding the steering wheel. The vehicle inside information detection unit 7500 may calculate the degree of fatigue of a driver or the degree of concentration on the basis of detected information which is input from the driver state detection part 7510, and may determine whether or not the driver is dozing off The vehicle inside information detection unit 7500 may perform processing such as noise cancelling processing on a collected sound signal.

The integral control unit 7600 controls the overall operation inside the vehicle control system 7000 in accordance with various programs. An input part 7800 is connected to the integral control unit 7600. The input part 7800 is realized by a device by which an occupant can perform an input operation, such as a touch panel, a button, a microphone, a switch, or a lever. Data obtained by recognizing a sound input through a microphone may be input to the integral control unit 7600. The input part 7800 may be a remote controller device using, for example, infrared rays or other radio waves, or may be an external connection apparatus such as a mobile phone or a personal digital assistant (PDA) corresponding to an operation of the vehicle control system 7000. The input part 7800 may be, for example, a camera. In this case, an occupant can input information through a gesture. Alternatively data obtained by detecting the movement of a wearable device worn by an occupant may be input. Further, the input part 7800 may include an input control circuit that generates an input signal on the basis of for example, information input by an occupant or the like using the input part 7800 and outputs the generated input signal to the integral control unit 7600, and the like. The occupant or the like operates the input part 7800 to input various pieces of data to the vehicle control system 7000 or give an instruction for a processing operation.

The storage part 7690 may include a read only memory (ROM) that stores various programs executed by a microcomputer, and a random access memory (RAM) that stores various parameters, arithmetic operation results, sensor values, and the like. In addition, the storage part 7690 may be realized by a magnetic storage device such as a hard disc drive (HDD), a semiconductor storage device, an optical storage device, an optical magnetic storage device, or the like.

The general-purpose communication 7620 is a general-purpose communication I/F that mediates communication between various apparatuses that are present in an outside environment 7750. The general-purpose communication I/F 7620 may be equipped with a cellular communication protocol such as global system of mobile communications (GSM) (registered trademark), WiMAX (registered trademark), long term evolution (LTE) (registered trademark), or LTE-Advanced (LTE-A), or other wireless communication protocols such as wireless LAN (also referred to as Wi-Fi (registered trademark)), or Bluetooth (registered trademark). The general-purpose communication I/F 7620 may be connected to an apparatus (for example, an application server or a control server) which is present on an external network (for example, the Internet, a cloud network, or a business-specific network) through, for example, a base station or an access point. In addition, the general-purpose communication I/F 7620 may be connected to a terminal which is present in the vicinity of a vehicle (for example, a terminal of a driver, a pedestrian, or a store, or a machine type communication (MTC) terminal) using, for example, a P2P (peer to peer) technique.

The dedicated communication I/F 7630 is a communication I/F that supports a communication protocol designed for use in a vehicle. The dedicated communication I/F 7630 may be equipped with a standard protocol such as a wireless access in vehicle environment (WAVE), which is a combination of IEEE 802.11p of a lower layer and IEEE 1609 of an upper layer, dedicated short range communications (DSRC), or a cellular communication protocol. The dedicated communication I/F 7630 typically performs V2X communication which is a concept including one or more of vehicle-to-vehicle communication, vehicle-to-infrastructure communication, vehicle-to-home communication, and vehicle-to-pedestrian communication.

The positioning part 7640 receives, for example, a GNSS signal from a global navigation satellite system (GNSS) satellite (for example, a global positioning system (GPS) signal from a GPS satellite) to execute positioning, and generates positional information including the latitude, longitude, and altitude of a vehicle. Meanwhile, the positioning part 7640 may specify the current position by exchanging signals with a wireless access point, or may acquire positional information from a terminal such as a mobile phone, a PHS, or smartphone having a positioning function.

The beacon reception part 7650 receives, for example, radio waves or electromagnetic waves transmitted from a radio station or the like installed on a road, and acquires information such as the current position, a traffic jam, a road closure, or a required time. Meanwhile, the functions of the beacon reception part 7650 may be included in the dedicated communication I/F 7630 described above.

The in-vehicle apparatus I/F 7660 is a communication interface that mediates connection between the microcomputer 7610 and various in-vehicle apparatuses 7760 that are present inside the vehicle. The in-vehicle apparatus I/F 7660 may establish wireless connection using a wireless communication protocol such as a wireless LAN, Bluetooth. (registered trademark), near field communication (NFC), or a wireless USB (WUSB). In addition, the in-vehicle apparatus I/F 7660 may establish wired connection such as a universal serial bus (USB), a high-definition multimedia interface (HDMI) (registered trademark), or a mobile high-definition link (MHL) through a connection terminal not illustrated in the drawing (and a cable as necessary). The in-vehicle apparatus 7760 may include at least one of, for example, a mobile apparatus or wearable apparatus carried by an occupant, or an information apparatus carried into or attached to a vehicle. In addition, the in-vehicle apparatus 7760 may include a navigation device that performs path searching to any destination. The in-vehicle apparatus I/F 7660 exchanges a control signal or a data signal with the in-vehicle apparatus 7760.

The on-vehicle network I/F 7680 is an interface that mediates communication between the microcomputer 7610 and the communication network 7010. The on-vehicle network I/F 7680 transmits and receives signals or the like in accordance with a predetermined protocol supported by the communication network 7010.

The microcomputer 7610 of the integral control unit 7600 controls the vehicle control system 7000 in accordance with various programs on the basis of information acquired through at least one of the general-purpose communication I/F 7620, the dedicated communication I/F 7630, the positioning part 7640, the beacon reception part 7650, the in-vehicle apparatus I/F 7660, and the on-vehicle network I/F 7680. For example, the microcomputer 7610 may arithmetically operate a control target value of a driving force generating device, a steering mechanism, or a braking device on the basis of acquired information on the inside and outside of vehicle and may output a control instruction to the driving system control unit 7100. For example, the microcomputer 7610 may perform cooperative control for realizing functions of an advanced driver assistance system (ADAS) including the avoidance of collision with a vehicle or the alleviation of collision, follow-up traveling based on an inter-vehicle distance, vehicle speed maintenance traveling, a warning of collision with a vehicle, a warning of vehicle deviation from a lane, or the like. In addition, the microcomputer 7610 may control a driving force generating device, a steering mechanism, a braking device, or the like to perform cooperative control for the purpose of performing automated operation that causes a vehicle to autonomously travel without depending on a driver's operation.

The microcomputer 7610 may generate three-dimensional distance information between the vehicle and an object such as the surrounding structure or a person on the basis of information acquired through at least one of the general-purpose communication I/F 7620, the dedicated communication I/F 7630, the positioning part 7640, the beacon reception part 7650, the in-vehicle apparatus I/F 7660, and the on-vehicle network I/F 7680 and create local map information including information on the surroundings of the current position of the vehicle. In addition, the microcomputer 7610 may predict dangers such as collision with a vehicle, approach of a pedestrian or the like, or entering a closed road on the basis of information acquired, and generate a warning signal. The warning signal may be, for example, a signal for generating a warning sound or turning on a warning lamp.

The sound image output part 7670 transmits an output signal of at least one of a sound and an image to an output device capable of visually or audibly notifying an occupant in the vehicle or the outside of the vehicle of information. In the example of FIG. 20, an audio speaker 7710, a display part 7720, and an instrument panel 7730 are illustrated as output devices. The display part 7720 may include at least one of, for example, an on-board display and a head-up display. The display part 7720 may have an augmented reality (AR) display function. Other than these devices, the output device may be a wearable device such as a headphone, an eyeglass-type display worn by an occupant, or other devices such as a projector or a lamp. In a case where the output device is a display device, the display device visually displays results obtained through various processes performed by the microcomputer 7610 or information received from other control units in various forms such as text, images, tables, or graphs. Further, in a case where the output device is a sound output device, the sound output device converts an audio signal, which is constituted by reproduced sound data, acoustic data, or the like, into an analog signal and audibly outputs the analog signal.

Meanwhile, in the example illustrated in FIG. 20, at least two control units connected through the communication network 7010 may be integrated as one control unit. Alternatively; an individual control unit may be constituted by a plurality of control units. Further, the vehicle control system 7000 may include another control unit not illustrated in the drawing. Further, in the above description, some or all of functions of any one control unit may be provided to other control units. That is, as long as information is transmitted and received through the communication network 7010, predetermined arithmetic processing may be performed by any one control unit. Similarly a sensor or a device connected to any one control unit may be connected to another control unit, and a plurality of control units may transmit and receive detected information to and from each other through the communication network 7010.

In the vehicle control system 7000 described above, the distance measuring device according to the present embodiment described using FIG. 21 can be applied to the vehicle outside information detection part 7420 according to the application example illustrated in FIG. 20. For example, a distance to an obstacle in front, of the vehicle 7900 can be calculated by the distance measuring device.

Meanwhile, the present technique can adopt the following configurations.

(1) A distance measuring device including:
a light source configured to emit light;
a light receiving element configured to receive light reflected from an object reflecting the light;
a variation amplification part configured to amplify a variation in a temporal relative relationship between an electrical signal output from the light receiving element and a clock signal;
a synchronizing part configured to generate a synchronizing signal by synchronizing the electrical signal with the clock signal on the basis of the electrical signal and the clock signal after the variation is amplified by the variation amplification part;
a histogram creating part configured to create a histogram based on a period of time from when the light source emits light to when the light receiving element receives reflected light, on the basis of the synchronizing signal generated by the synchronizing part; and
a distance calculation part configured to calculate a distance to the object on the basis of the histogram created by the histogram creating part.

(2) The distance measuring device according to (1), wherein
the variation amplification part adds jitter to at least, one of the electrical signal output from the light receiving element and the clock signal.

(3) The distance measuring device according to (2), wherein
the variation amplification part includes
a first addition part configured to receive an input of the electrical signal and outputs the electrical signal having jitter added thereto, and
a second addition part configured to receive an input of the clock signal and outputs the clock signal having jitter added thereto.

(4) The distance measuring device according to (3), wherein
each of the first addition part and the second addition part includes at least one or more of a logic gate and an RC circuit.

(5) The distance measuring device according to (4), wherein
the logic gate constitutes a multiple-stage delay circuit connected thereto in series.

(6) The distance measuring device according to (4), wherein.
a resistor of the RC circuit is a variable resistor.

(7) The distance measuring device according to (4) or (6), wherein
a capacitor of the RC circuit is a variable capacitor.

(8) The distance measuring device according to any one of (3) to (7), further including:
a first electrical path that is disposed in parallel with the first addition part and is configured to transmit the electrical signal output from the light receiving element;
a first exclusive operation switch configured to output either one of the electrical signal output from the first addition part and having jitter added thereto and the electrical signal passing through the first electrical path to the synchronizing part;
a second electrical path that is disposed in parallel with the second addition part and is configured to transmit the clock signal; and
a second exclusive operation switch configured to output either one of the clock signal output from the second addition part and having jitter added thereto and the clock signal passing through the second electrical path to the synchronizing part, wherein
the synchronizing part generates a synchronizing signal by synchronizing an electrical signal output from the first exclusive operation switch with the clock signal output from the second exclusive operation switch.

(9) The distance measuring device according to (8), wherein
the first exclusive operation switch outputs the electrical signal passing through the first electrical path to the synchronizing part in a case where a width of a bin of the histogram is equal to or less than a predetermined width determined in advance, and
the second exclusive operation switch outputs the electrical signal passing through the second electrical path to the synchronizing part in a case where a width of a bin of the histogram is equal to or less than a predetermined width determined in advance.

(10) The distance measuring device according to (8) or (9), wherein
each of the first exclusive operation switch and the second exclusive operation switch includes any of an NMOS switch, a PMOS switch, a CMOS switch, a NAND gate, and a NOR gate.

(11) The distance measuring device according to any one of (1) to (10), wherein
the variation amplification part is configured such that an amount of amplitude of the variation is equal to greater than $\frac{1}{3}$ and equal to or less than $\frac{1}{2}$ of a width of a bin of the histogram.

(12) The distance measuring device according to (1), wherein
the light receiving element is an SPAD, and
the variation amplification part controls a voltage between an anode and a cathode of the SPAD so that jitter is added to the electrical signal.

(13) The distance measuring device according to (1), wherein
the variation amplification part controls a wavelength of light emitted by the light source so that jitter is added to the electrical signal.

(14) The distance measuring device according to (1), wherein
the variation amplification part controls temperature of the light receiving element so that jitter is added to the electrical signal.

(15) A distance measuring method including:
receiving light, reflected from an object reflecting light periodically emitted by a light source, by a light receiving element and outputting electrical signals one after another; amplifying a variation in a temporal relative relationship between the output electrical signal and a clock signal; generating synchronizing signals one after another by synchronizing the electrical signal with the clock signal on the basis of the electrical signal and the clock signal after the variation is amplified; creating a histogram based on a period of time from when the light source emits light to when the light receiving element receives reflected light, on the basis of the generated synchronizing signal; and calculating a distance to the object on the basis of the created histogram.

REFERENCE SIGNS LIST

1 Distance measuring device
2 Light projection part
3 Light receiving part
4 Distance measurement processing part
5 Control part
6 Communication IF part
7 Light
8 Light source
9 Emitter lens
10 Light projection mirror
11 Micro mirror
12 Object
13 Reflected light
14 Receiver lens
16 TDC
15 Light receiving element
17 Histogram creating part
18 Distance calculation part
19 Variation amplification part
20 Synchronizing part
21 First electrical path
$22_1$ to $22_n$ First addition part
23 First exclusive operation switch
24 Second electrical path
$25_1$ to $25_n$ Second addition part
26 Second exclusive operation switch
27 Input terminal
$28_0$ to $28_n$ First switch
29 Output terminal
30 nput terminal
$31_0$ to $31_n$ Second switch
32 Output terminal
33 Voltage control part
34 Wavelength control part
35 Temperature control part
7000 Vehicle control system
7010 Communication network
7100 Driving system control unit
7110 Vehicle state detection part
7200 Body system control unit
7300 Battery control unit
7310 Secondary battery
7400 Vehicle outside information detection part
7410 Imaging part
7420 Vehicle outside information detection part
7500 Vehicle inside information detection part
7510 Driver state detection part
7600 Integral control unit
7610 Microcomputer
7620 General-purpose communication I/F
7630 Dedicated communication I/F
7640 Positioning part
7650 Beacon reception part
7660 In-vehicle apparatus I/F
7670 Sound image output part
7680 On-vehicle network I/F
7690 Storage part
7710 Audio speaker
7720 Display part
7730 Instrument panel.
7750 Outside environment
7760 In-vehicle apparatus
7800 Input part
7900 Vehicle
7910, 7912, 7914, 7916, 7918 imaging part
7920, 7921, 7922, 7923, 7924, 7925, 7926, 7927, 7928, 7929, 7930 Vehicle outside information detection part

The invention claimed is:

1. A distance measuring device comprising:
   a light source configured to emit light;
   a light receiving element configured to receive light reflected from an object reflecting the light;
   a variation amplification circuit configured to amplify a variation in a temporal relative relationship between an electrical signal output from the light receiving element and a clock signal;
   a synchronizing circuit configured to generate a synchronizing signal by synchronizing the electrical signal with the clock signal on the basis of the electrical signal and the clock signal after the variation is amplified by the variation amplification circuit;
   a histogram creating circuit configured to create a histogram based on a period of time from when the light source emits light to when the light receiving element receives reflected light, on the basis of the synchronizing signal generated by the synchronizing circuit; and
   a distance calculation circuit configured to calculate a distance to the object on the basis of the histogram created by the histogram creating circuit, wherein
   the variation amplification circuit adds jitter to at least one of the electrical signal output from the light receiving element and the clock signal, and
   the variation amplification circuit includes
   a first addition circuit configured to receive an input of the electrical signal and outputs the electrical signal having jitter added thereto, and
   a second addition circuit configured to receive an input of the clock signal and outputs the clock signal having jitter added thereto.

2. The distance measuring device according to claim 1, wherein each of the first addition circuit and the second addition circuit includes at least one or more of a logic gate and an RC circuit.

3. The distance measuring device according to claim 2, wherein the logic gate constitutes a multiple-stage delay circuit connected thereto in series.

4. The distance measuring device according to claim 2, wherein a resistor of the RC circuit is a variable resistor.

5. The distance measuring device according to claim 2, wherein a capacitor of the RC circuit is a variable capacitor.

6. The distance measuring device according to claim 1, further comprising:
   a first electrical path that is disposed in parallel with the first addition circuit and is configured to transmit the electrical signal output from the light receiving element;
   a first exclusive operation switch configured to output either one of the electrical signal output from the first addition circuit and having jitter added thereto and the electrical signal passing through the first electrical path to the synchronizing circuit;
   a second electrical path that is disposed in parallel with the second addition circuit and is configured to the clock signal; and
   a second exclusive operation switch configured to output either one of the clock signal output from the second addition circuit and having jitter added thereto and the clock signal passing through the second electrical path to the synchronizing circuit, wherein
   the synchronizing circuit generates a synchronizing signal by synchronizing an electrical signal output from the first exclusive operation switch with the clock signal output from the second exclusive operation switch.

7. The distance measuring device according to claim 6, wherein
the first exclusive operation switch outputs the electrical signal passing through the first electrical path to the synchronizing circuit in a case where a width of a bin of the histogram is equal to or less than a predetermined width determined in advance, and
the second exclusive operation switch outputs the electrical signal passing through the second electrical path to the synchronizing circuit in a case where a width of the bin of the histogram is equal to or less than the predetermined width determined in advance.

8. The distance measuring device according to claim 6, wherein each of the first exclusive operation switch and the second exclusive operation switch includes any of an NMOS switch, a PMOS switch, a CMOS switch, a NAND gate, and a NOR gate.

9. A distance measuring device comprising:
a light source configured to emit light;
a light receiving element configured to receive light reflected from an object reflecting the light;
a variation amplification circuit configured to amplify a variation in a temporal relative relationship between an electrical signal output from the light receiving element and a clock signal;
a synchronizing circuit configured to generate a synchronizing signal by synchronizing the electrical signal with the clock signal on the basis of the electrical signal and the clock signal after the variation is amplified by the variation amplification circuit;
a histogram creating circuit configured to create a histogram based on a period of time from when the light source emits light to when the light receiving element receives reflected light, on the basis of the synchronizing signal generated by the synchronizing circuit; and
a distance calculation circuit configured to calculate a distance to the object on the basis of the histogram created by the histogram creating circuit, wherein
the variation amplification circuit is configured such that an amount of amplitude of the variation is equal to greater than ⅓ and equal to or less than ½ of a width of a bin of the histogram.

10. A distance measuring device comprising:
a light source configured to emit light;
a light receiving element configured to receive light reflected from an object reflecting the light;
a variation amplification circuit configured to amplify a variation in a temporal relative relationship between an electrical signal output from the light receiving element and a clock signal;
a synchronizing circuit configured to generate a synchronizing signal by synchronizing the electrical signal with the clock signal on the basis of the electrical signal and the clock signal after the variation is amplified by the variation amplification circuit;
a histogram creating circuit configured to create a histogram based on a period of time from when the light source emits light to when the light receiving element receives reflected light, on the basis of the synchronizing signal generated by the synchronizing circuit; and
a distance calculation circuit configured to calculate a distance to the object on the basis of the histogram created by the histogram creating circuit, wherein
the light receiving element is an SPAD, and
the variation amplification circuit controls a voltage between an anode and a cathode of the SPAD so that jitter is added to the electrical signal.

11. The distance measuring device according to claim 1, wherein
the variation amplification circuit controls a wavelength of light emitted by the light source so that jitter is added to the electrical signal.

12. The distance measuring device according to claim 1, wherein the variation amplification circuit controls a temperature of the light receiving element so that jitter is added to the electrical signal.

13. A distance measuring method comprising:
receiving light, reflected from an object reflecting light periodically emitted by a light source, by a light receiving element and outputting electrical signals one after another, wherein the light receiving element is an SPAD;
amplifying a variation in a temporal relative relationship between the output electrical signal and a clock signal;
generating synchronizing signals one after another by synchronizing the electrical signal with the clock signal on the basis of the electrical signal and the clock signal after the variation is amplified;
creating a histogram based on a period of time from when the light source emits light to when the light receiving element receives reflected light, on the basis of the generated synchronizing signal;
calculating a distance to the object on the basis of the created histogram; and
controlling a voltage between an anode and a cathode of the SPAD so that jitter is added to the electrical signal.

14. A non-transitory computer readable medium storing a program for distance measuring, the program being executable by a processor to perform operations comprising:
receiving light, reflected from an object reflecting light periodically emitted by a light source, by a light receiving element and outputting electrical signals one after another, wherein the light receiving element is an SPAD;
amplifying a variation in a temporal relative relationship between the output electrical signal and a clock signal;
generating synchronizing signals one after another by synchronizing the electrical signal with the clock signal on the basis of the electrical signal and the clock signal after the variation is amplified;
creating a histogram based on a period of time from when the light source emits light to when the light receiving element receives reflected light, on the basis of the generated synchronizing signal;
calculating a distance to the object on the basis of the created histogram; and
controlling a voltage between an anode and a cathode of the SPAD so that jitter is added to the electrical signal.

15. A non-transitory computer readable medium storing a program for distance measuring, the program being executable by a processor to perform operations comprising:
receiving light, reflected from an object reflecting light periodically emitted by a light source, by a light receiving element and outputting electrical signals one after another;
amplifying a variation in a temporal relative relationship between the output electrical signal and a clock signal;
generating synchronizing signals one after another by synchronizing the electrical signal with the clock signal on the basis of the electrical signal and the clock signal after the variation is amplified;

creating a histogram based on a period of time from when the light source emits light to when the light receiving element receives reflected light, on the basis of the generated synchronizing signal;

calculating a distance to the object on the basis of the created histogram;

adding jitter to at least one of the electrical signal output from the light receiving element and the clock signal;

receiving an input of the electrical signal and outputting the electrical signal having jitter added thereto; and receiving an input of the clock signal and outputting the clock signal having jitter added thereto.

16. A non-transitory computer readable medium storing a program for distance measuring, the program being executable by a processor to perform operations comprising:

receiving light, reflected from an object reflecting light periodically emitted by a light source, by a light receiving element and outputting electrical signals one after another;

amplifying a variation in a temporal relative relationship between the output electrical signal and a clock signal;

generating synchronizing signals one after another by synchronizing the electrical signal with the clock signal on the basis of the electrical signal and the clock signal after the variation is amplified;

creating a histogram based on a period of time from when the light source emits light to when the light receiving element receives reflected light, on the basis of the generated synchronizing signal; and calculating a distance to the object on the basis of the created histogram, wherein an amount of amplitude of the variation is equal to greater than $1/3$ and equal to or less than $1/2$ of a width of a bin of the histogram.

* * * * *